United States Patent
Berkey et al.

(10) Patent No.: US 6,173,588 B1
(45) Date of Patent: Jan. 16, 2001

(54) METHOD OF MAKING DISPERSION MANAGED OPTICAL FIBERS

(75) Inventors: George E. Berkey, Pine City; Venkata A. Bhagavatula, Big Flats, both of NY (US)

(73) Assignee: Corning Incorporated, Corning, NY (US)

( * ) Notice: Under 35 U.S.C. 154(b), the term of this patent shall be extended for 0 days.

(21) Appl. No.: 09/300,894

(22) Filed: Apr. 28, 1999

Related U.S. Application Data

(63) Continuation-in-part of application No. 09/185,472, filed on Nov. 3, 1998, now Pat. No. 6,044,191, and a continuation-in-part of application No. 08/844,997, filed on Apr. 23, 1997, which is a continuation of application No. 08/584,868, filed on Jan. 11, 1996, now Pat. No. 5,894,537.
(60) Provisional application No. 60/083,878, filed on May 1, 1998, and provisional application No. 60/016,435, filed on Apr. 26, 1996.

(51) Int. Cl.⁷ ................................................. C03B 37/027
(52) U.S. Cl. ..................... 65/407; 65/36; 65/42; 65/428; 65/412
(58) Field of Search .............................. 65/403, 407, 406, 65/412, 428, 36, 42

(56) References Cited

U.S. PATENT DOCUMENTS

| | | | |
|---|---|---|---|
| 3,966,446 | 6/1976 | Miller | 65/2 |
| 4,195,980 | 4/1980 | Sterling et al. | 65/3 |
| 4,212,660 | 7/1980 | Maurer | 65/3 |
| 4,407,667 | 10/1983 | Le Noane et al. | 65/3.11 |
| 4,978,377 | * 12/1990 | Brehm | 65/403 |
| 5,618,325 | 4/1997 | Baniel | 65/3 |
| 5,894,537 | * 4/1999 | Berkey | |

FOREIGN PATENT DOCUMENTS

| | | | |
|---|---|---|---|
| 0 718 244 | 6/1996 | (EP) . | |
| 0 737 873 | 10/1996 | (EP) . | |
| 1448080 | 7/1976 | (GB) . | |
| 57-67040 | * 4/1982 | (JP) | 65/407 |
| 57-111256 | * 7/1982 | (JP) | 65/407 |
| 59-6264 | * 2/1984 | (JP) | 65/406 |

OTHER PUBLICATIONS

English Abstract of JP 03–016930, Apr. 02, 1991.
English Abstract of JP 55–158146, Feb. 25, 1981.

* cited by examiner

*Primary Examiner*—John Hoffmann
(74) *Attorney, Agent, or Firm*—Robert L. Carlson; Randall S. Wayland

(57) ABSTRACT

An optical fiber having optical characteristics that vary along its length is made by assembling a plurality of cylindrical glass or soot tablets into or along a glass tablet alignment device, then fused into monolithic assembly. If desired, additional glass may be applied to the assembly before or after the fusing step. A vacuum is preferably applied during the fusing step. Each tablet preferably contains a core region, and it optionally contains a layer of cladding glass. Adjacent tablets are capable of forming optical fiber sections having different optical properties. Prior to consolidating the glass particles, chlorine preferably flows through or around the tablets and alignment device. The resultant draw blank can be drawn into a low loss optical fiber having short transition regions between adjacent areas of fiber. This method is particularly useful for making dispersion managed single-mode optical fibers.

35 Claims, 14 Drawing Sheets

FIG. 7
FIG. 8
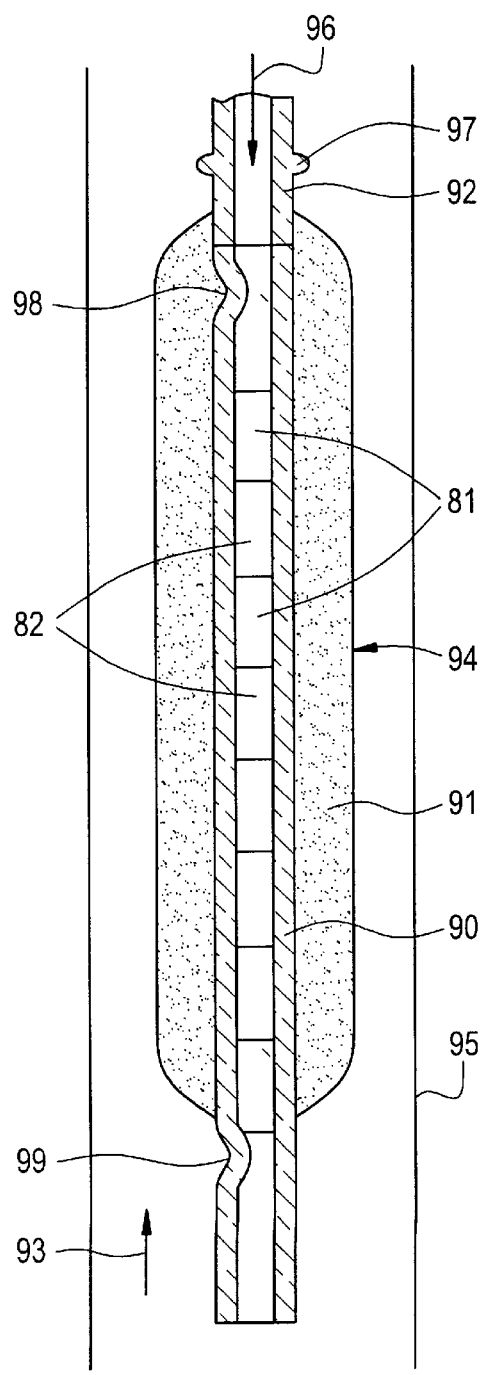
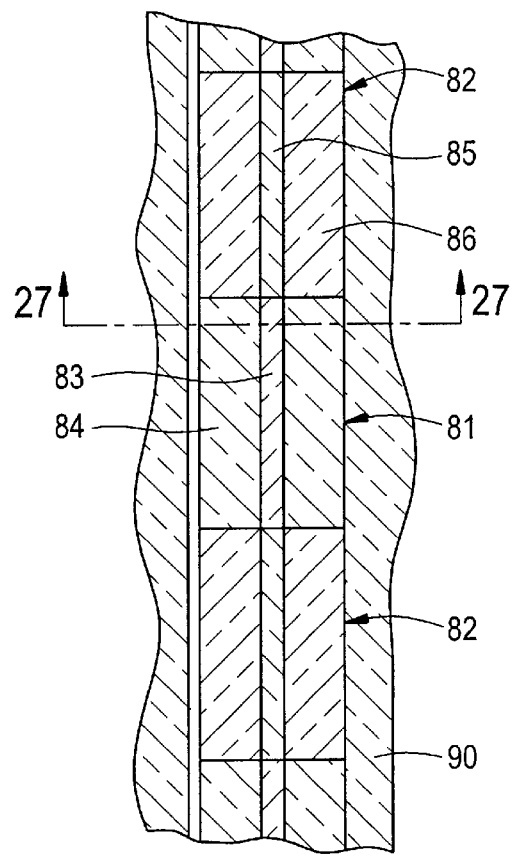

METHOD OF MAKING DISPERSION MANAGED OPTICAL FIBERS

RELATED APPLICATIONS

This application is a Continuation-In-Part application of U.S. patent application Ser. No. 08/844,997, filed Apr. 23, 1997 (and which claims the benefit of provisional application No. 60/016,435, filed Apr. 26, 1996). This application also claims the benefit of U.S. Provisional Application No. 60/083,878, filed May 1, 1998. This application is also a Continuation-in-Part application of U.S. patent application Ser. No. 09/185,472 filed Nov. 3, 1998, now U.S. Pat. No. 6,044,191 (which is a continuation application of U.S. patent application Ser. No. 08/584,868 filed Jan. 11, 1996, now issued as U.S. Pat. No. 5,894,537).

BACKGROUND

The invention is directed to a method for making an optical fiber having optical properties that systematically vary along its length. This method is particularly useful for making dispersion managed (DM) single-mode optical waveguide fibers.

The potentially high bandwidth of single-mode optical fibers can be realized only if the system design is optimized so that the total dispersion is equal to zero or nearly equal to zero at the operating wavelength. The term "dispersion" refers to pulse broadening and is expressed in ps/nm-km. "Dispersion Product" refers to dispersion times length and is expressed in ps/nm.

When telecommunications networks employ multiple channel communications or wavelength division multiplexing, the system can experience a performance degradation due to four wave mixing. This performance degradation occurs when the signal wavelength is at or near the zero dispersion wavelength of the optical transmission fiber. This has necessitated the exploration of waveguide fiber designs which can minimize signal degradation that results from this non-linear waveguide effect. A dilemma arises in the design of a waveguide fiber to minimize four wave mixing while maintaining characteristics required for systems which have long spacing between regenerators. That is, in order to substantially eliminate four wave mixing, the waveguide fiber should not be operated near its zero of total dispersion, because four wave mixing occurs when waveguide dispersion is low, i.e., less than about 0.5 ps/nm-km. On the other hand, signals having a wavelength away from the zero of total dispersion of the waveguide are degraded because of the presence of the total dispersion.

One strategy that has been proposed to overcome this dilemma is to construct a system using cabled waveguide fiber segments some of which have a positive total dispersion and some of which have a negative total dispersion. If the length weighted average of dispersion for all the cable segments is close to zero, the regenerator spacing can be large. However, the signal essentially never passes through a waveguide length where the local dispersion is close to zero, so that four wave mixing is prevented.

The problem with this strategy is that each link between regenerators must be tailored to give the required length weighted average of dispersion. Maintaining cable dispersion identity from cabling plant through to installation is an undesirable added task and a source of error. Further, the need to provide not only the proper dispersion, but also the proper length of cable having that dispersion, increases the difficulty of manufacture and leads to increased system cost. A further problem arises when one considers the need for replacement cables.

Those problems are overcome by the optical fiber disclosed in U.S. patent application Ser. No. 08/584,868 (Berkey et al.) filed Jan. 11, 1996 now U.S. Pat. No. 5894537, the specification of which is hereby incorporated by reference. In accordance with the teachings of the Berkey et al. application, each individual fiber is made to be a self contained dispersion managed system. A pre-selected, length weighted average of total dispersion, i.e., total dispersion product, is designed into each waveguide fiber. Each waveguide fiber is interchangeable with any other waveguide fiber designed for that system link. Thus, the cabled waveguide fibers all have essentially identical dispersion product characteristics, and there is no need to assign a particular set of cables to a particular part of the system. Power penalty due to four wave mixing is essentially eliminated, or reduced to a pre-selected level, while total link dispersion is held to a pre-selected value, which may be a value substantially equal to zero.

In accordance with the Berkey et al. patent application, the dispersion of a DM fiber varies between a range of positive values and a range of negative values along the waveguide length. The dispersion product, expressed as ps/nm, of a particular length, l, is the product (D ps/nm-km*l km). A positive number of ps/nm will cancel an equal negative number of ps/nm. In general, the dispersion associated with a length $l_i$ may vary from point to point along $l_i$. That is, the dispersion $D_i$ lies within a pre-determined range of dispersions, but may vary from point to point along $l_i$. To express the contribution of $l_i$ to the dispersion product, expressed in ps/nm, $l_i$ is made up of segments $dl_i$ over which the associated total dispersion $D_i$ is essentially constant. Then the sum of products $dl_i*D_i$ characterizes the dispersion product contribution of $l_i$. Note that, in the limit where $dl_i$ approaches zero, the sum of products $dl_i*D_i$ is simply the integral of $dl_i*D_i$ over the length $l_i$. If the dispersion is essentially constant over sub-length $l_i$, then the sum of products is simply $l_i*D_i$.

The dispersion of the overall waveguide fiber length is managed by controlling the dispersion $D_i$ of each segment $dl_i$, so that the sum of the products $D_i*dl_i$ is equal to a pre-selected value over a wavelength range wherein signals may be multiplexed. For high rate systems having long regenerator spacing, the wavelength range in the low attenuation window from about 1525 nm to 1565 nm may be advantageously chosen. In this case, the sum of the dispersion products for the DM fiber would have to be targeted at zero over that range of wavelengths. The $D_i$ magnitudes (absolute value) are held above 0.5 ps/nm-km to substantially prevent four wave mixing and below about 20 ps/nm-km so that overly large swings in the waveguide fiber parameters are not required.

The length over which a given total dispersion persists is generally greater than about 0.1 km. This lower length limit reduces the power penalty (see FIG. 5), and simplifies the manufacturing process.

The period of a DM single-mode waveguide is defined as a first length having a total dispersion which is within a first range, plus a second length having a dispersion which is in a second range, wherein the first and second ranges are of opposite sign, plus a transition length over which the dispersion makes a transition between the first and second range. To avoid four wave mixing and any associated power penalty over the transition length, it is advantageous to keep the part of the transition length which has an associated total dispersion less than about 0.5 ps/nm-km as short as possible.

If the transition regions between the regions of positive and negative dispersion are too long, the dispersion in the central portions of the transition regions will be near zero for some finite length of fiber. This will result in some power penalty due to four wave mixing. The longer the transition regions are, the higher the power penalty. The transition regions should therefore be sufficiently sharp that the fiber power penalty does not cause the total system power penalty to exceed the allocated power penalty budget. Preferably, the transition regions between adjacent areas of fiber are less than 10 meters, preferably less than 5 meters, and most preferably less than 3 meters in length.

A primary requirement of a process for making DM fibers is that it be able to form short transition regions. Moreover, the process of making the DM fiber should not be one that itself induces an excess loss that is unrelated to four wave mixing. Also, the process should be simple and be sufficiently flexible that it can be implemented with a variety of fiber designs and materials. Thus, the DM fiber must be a unitary fiber that is formed by drawing a draw preform or draw blank that includes sections that will form the fiber sections of different dispersion. Such a unitary fiber does not include splices between separately drawn fiber sections, as each splice would introduce additional loss. Ideally, the total attenuation of the unitary fiber is no greater than the composite of the weighted attenuation of each of the serially disposed sections of which it is formed.

SUMMARY OF THE INVENTION

One aspect of the invention relates to a method of making an optical fiber preform. Briefly, the method comprises arranging alternating regions or tablets of glass along or within a device for maintaining the alternating regions of glass in a desired relationship with respect to one another. At least one optical characteristic of at least one of the tablets is different than that of an adjacent tablet. While the invention can be utilized to make fibers which are useful at wavelengths, for example, as low as 1300 nm and as high as 1620 nm, the invention is particularly advantageous in forming fibers having alternating dispersion characteristics at wavelengths greater than 1480 nm, e.g., in the 1550 nm operating window the alternating glass regions comprises a negative local dispersion and an adjacent one of the glass regions comprises a positive local dispersion at 1550 nm. This may be achieved, for example, by assembling alternating regions of glass having different composition or core index profiles or dopant levels. These alternating glass regions are then fused together by heating the glass regions to a temperature sufficient to cause the glass regions to fuse together and consolidate into a preform, or a precursor for a preform, which can be used to draw an optical fiber therefrom.

In one embodiment, the alignment device is a glass tube, and the tablets are inserted into the glass tube. The tablets may, for example, be constructed of a desired core glass material, and the tube constructed of an outer core glass material or a cladding material. Alternatively, the tablets could be comprised of both core and cladding material.

In another embodiment, the alignment device is a glass rod, and the tablets are rings or donuts of glass which may be aligned along the rod in a desired relationship. The rod may be, for example, a core glass material, and the glass donuts constructed of an outer core material or a cladding material. In a preferred embodiment, alternating donuts or different dopant or composition level are used to form at least a portion of an outer core region which varies along the length of a constant composition inner core region.

The tablets are then exposed to a fusing step in which the resultant assembly is heated to a temperature sufficient to fuse the tablets to one another. Prior to the fusing step, the tablets are preferably submitted to a cleaning step in which the tablets are heated and exposed to a cleaning gas, such as pure chlorine or chlorine mixed with a diluent gas. If needed or desired, a vacuum can be applied to facilitate void free fusing of the tablets together. In the embodiment which employs tablets arranged within a tube, this may be achieved easily by applying a vacuum to the tube. In the embodiment which employs rings displaced along a rod, application of a vacuum may be facilitated by first applying an additional outer glass soot layer via CVD and submitting the soot cladding to a consolidation step, then applying a vacuum to the outer consolidated glass. The consolidation step also helps generate a radially-inwardly directed force that causes the assembly to collapse onto and fuse to the tablets, and causing the assembly to shrink longitudinally, whereby adjacent tablets are urged toward one another and are fused to one another.

Additional layers of glass may be added as desired. Preferably, CVD methods are employed to deposit these additional layers, after which these layers may be consolidated into glass. Prior to consolidation, these additional layers are first exposed to a cleaning step, wherein the coated assembly is heated to a temperature less than the sintering temperature of the cladding glass particles, a centerline gas is flowed through the tube. The centerline gas is selected from the group consisting of pure chlorine and chlorine mixed with a diluent gas. Thereafter, the coated assembly is heated to sinter the coating.

A further aspect of the invention concerns a unitary (i.e., which is not made up of fiber sections which are spliced together) optical fiber that results from the above-described method. The fiber comprises a plurality of serially disposed optical fiber sections, each fiber section having a glass core and a glass outer cladding. The core of a first fiber section is different from the core of each fiber section that is adjacent to the first section. The cladding of the first fiber section is identical to the cladding of the adjacent fiber sections. Between each two adjacent fiber sections is a transition region, the length of which preferably is less than 10 meters.

BRIEF DESCRIPTION OF THE DRAWINGS

FIG. 7 is a schematic representation of a process of making an optical fiber, adjacent sections of which have distinctly different characteristics.

FIG. 8 is an enlarged cross-sectional view of the tablets of FIG. 7.

DETAILED DESCRIPTION OF THE INVENTION

Dispersion Managed Fiber Design

Figure 1:
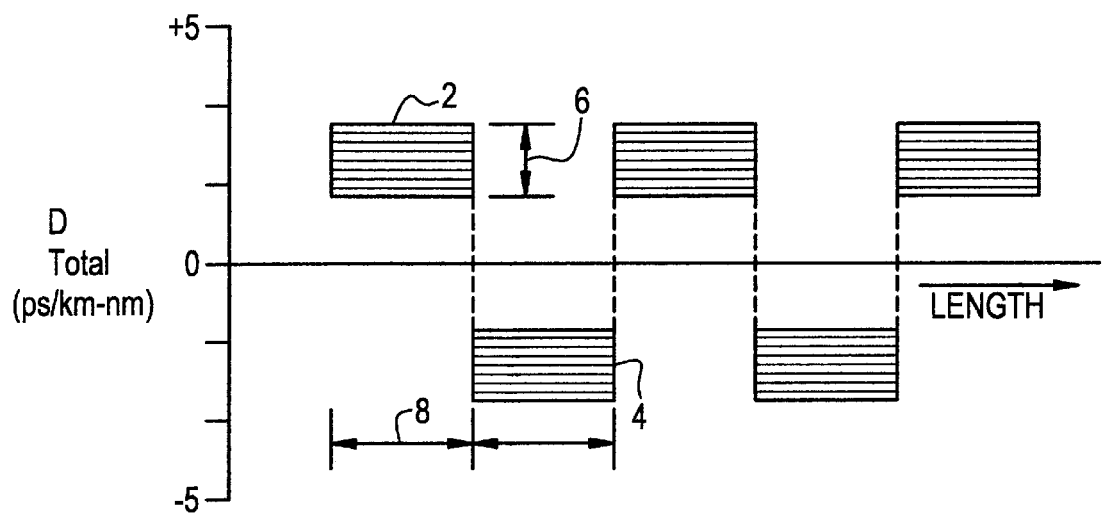
FIG. 1 is an illustration of total dispersion varying along the waveguide fiber length.

The total dispersion of a DM fiber is charted vs. waveguide length in FIG. 1. The total dispersion is seen to alternate between positive values 2 and negative values 4. Whereas FIG. 1 illustrates a plurality of sublengths exhibiting negative dispersion and a plurality of sublengths exhibiting positive dispersion, only one negative dispersion sublength and one positive dispersion sublength are required. The spread in total dispersion values indicated by line 6 illustrates that total dispersion varies with the wavelength of light propagated. The horizontal lines of the spread 6 represent total dispersion for a particular light wavelength. In general, the length of waveguide 8, characterized by a particular total dispersion, is greater than about 0.1 km. There is essentially no upper limit on length 8 except one which may be inferred from the requirement that the sum of products, length x corresponding total dispersion, is equal to a pre-selected value.

Figure 2:
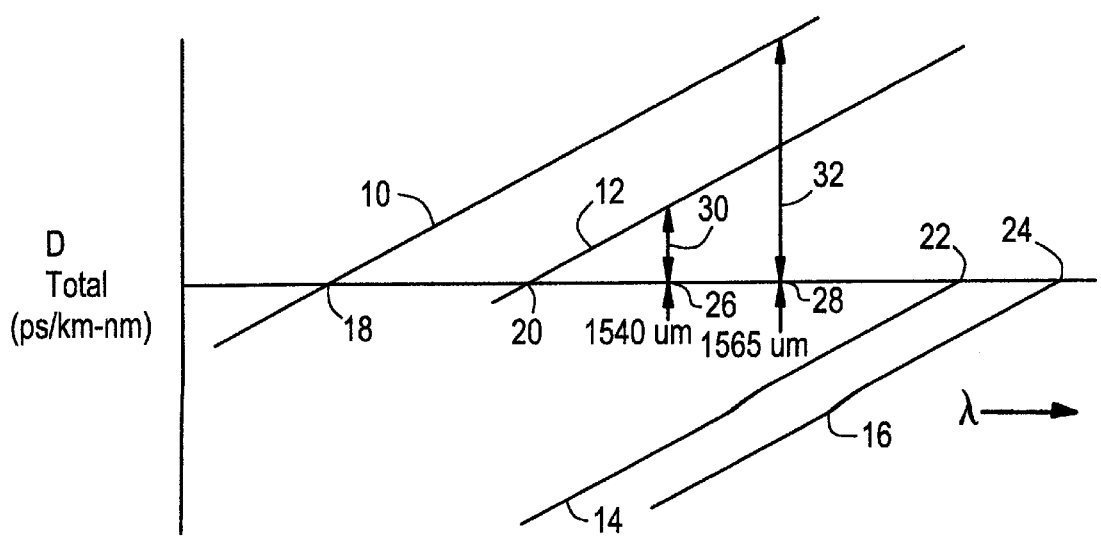
FIG. 2 shows how the zero dispersion of a waveguide fiber may vary to maintain total dispersion of the waveguide within a pre-selected range over a pre-determined wavelength window.

The chart of total dispersion vs. wavelength shown in FIG. 2 serves to illustrate design considerations for a DM single-mode waveguide fiber. Lines 10, 12, 14 and 16 represent total dispersion for four individual waveguide fibers. Over the narrow wavelength range considered for each waveguide, i.e., about 30 nm, the dispersion may be approximated by a straight line as shown. The wavelength range in which multiplexing is to be done is the range from 26 to 28. Any waveguide segment which has a zero dispersion wavelength in the range of 18 to 20 may be combined with a waveguide segment having a zero dispersion wavelength in the range 22 to 24, to yield a waveguide having a pre-selected total dispersion over the operating window 26 to 28.

The following example is based on FIG. 2. Take the operating window to be 1540 nm to 1565 nm. Assume that the single-mode waveguide fiber has a dispersion slope of about 0.08 ps/nm$^2$-km. Let line 30 be the 0.5 ps/nm-km value and line 32 the 4 ps/nm-km value. Apply the condition that the total dispersion within the operating window must be in the range of about 0.5 to 4 ps/nm-km. A simple straight line calculation then yields zero dispersion wavelength range, 18 to 20, of 1515 nm to 1534 nm. A similar calculation yields a zero dispersion wavelength range, 22 to 24, of 1570 nm to 1590 nm. Algebraic addition of the total dispersion of waveguide fiber segments having dispersion zero within the stated ranges will yield a total dispersion between 0.5 and 4 ps/nm-km.

Although, in FIG. 2, only waveguide fibers having positive dispersion slopes are illustrated, the present invention is not limited thereto. For example, in addition to alternating sections of positive and negative dispersion, in one preferred embodiment of the invention, the fiber of the present invention is constructed so that it alternates between areas of positive slope dispersion adjacent to areas of negative slope dispersion. The fiber may also be constructed of alternating sections having different effective areas. In another preferred embodiment, the fiber is constructed so that adjacent sections alternate between areas of negative total dispersion having a negative dispersion slope and areas of positive total dispersion having a positive dispersion slope. In another preferred embodiment, the fiber is constructed so that adjacent sections alternate between areas of negative total dispersion having a low or zero dispersion slope and areas of positive total dispersion having a low or zero dispersion slope, e.g. less than 0.02 ps/nm$^2$km, more preferably less than 0.01 ps/nm$^2$km.

Figure 3A:
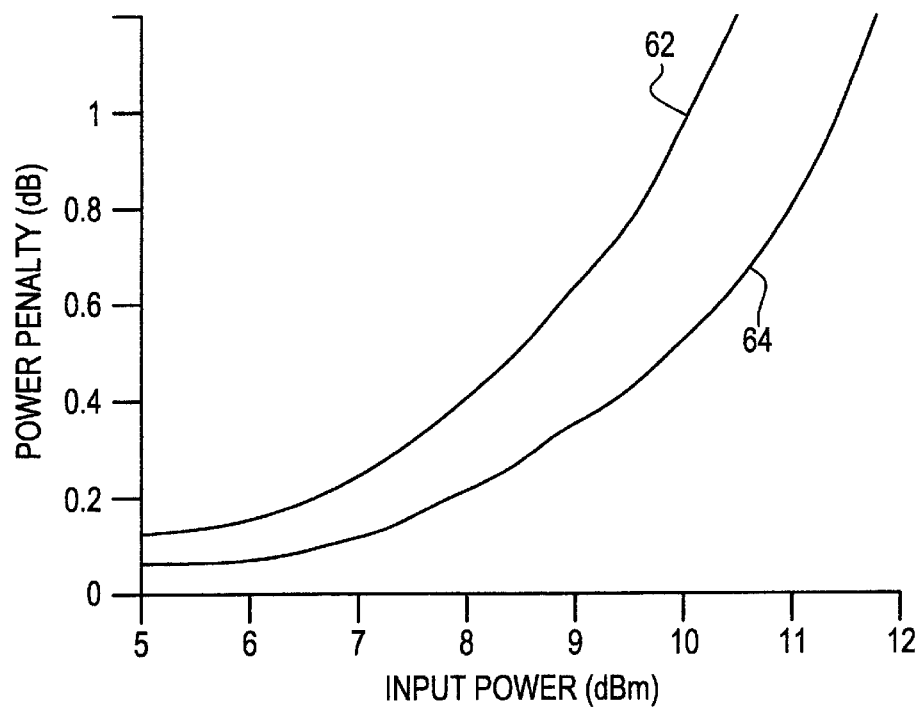
FIG. 3a is a chart illustrating the power penalty vs. input power for a system comprised of particular waveguide sub-lengths having a low total dispersion magnitude.
Figure 3B:
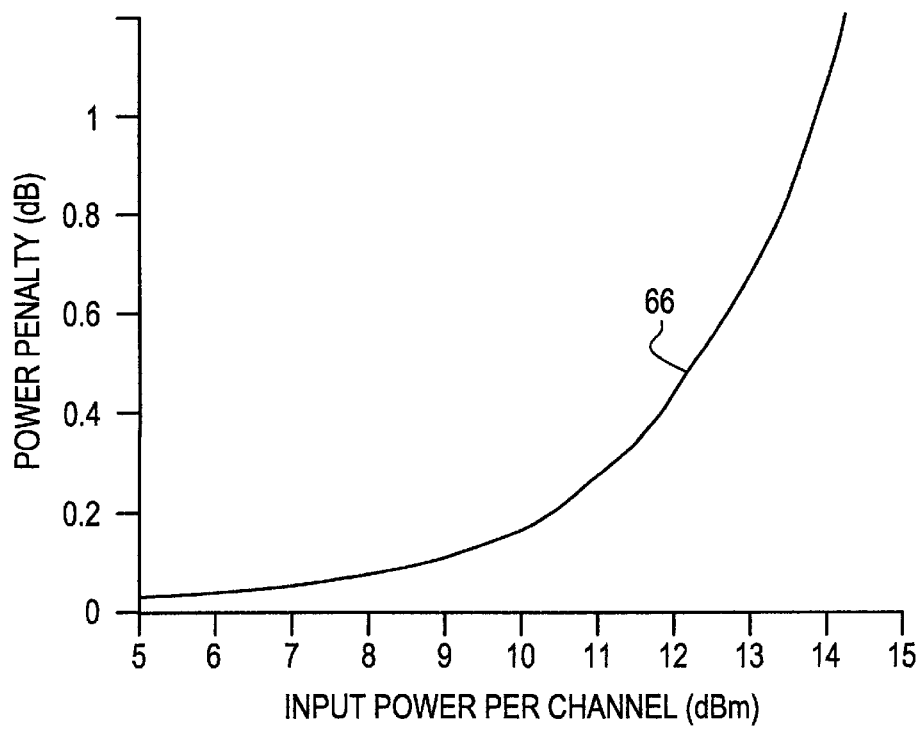
FIG. 3b is a chart illustrating the power penalty vs. input power for a system comprised of particular waveguide sub-lengths having a higher total dispersion magnitude.

The design of the DM fiber depends strongly on the details of the telecommunication system as can be seen in FIGS. 3a and 3b which show power penalty charted vs. input power for a 120 km link having 8 channels, wherein the frequency separation of channels is 200 GHz. In this case the power penalty is that due primarily to four wave mixing. Curve 62 in FIG. 3a rises steeply to a penalty near 1 dB for an input power of about 10 dBm. The penalty is about 0.6 dB for an input power of 10 dBm (curve 64). For both curves the magnitude of the total dispersion is about 0.5 ps/nm-km. However, for the steeper curve 62 the sub-length for total dispersion of a given sign is 10 km. The corresponding sub-length of the dispersion in curve 64 is 60 km. The extra penalty results from the additional transitions through zero dispersion for the shorter, 10 km sub-length case. An alternative statement is for the 10 km case, the phase separation of the signals, which is proportional to the oscillation sub-length, is not large enough to substantially prevent four wave mixing. An "oscillation sub-length" is either the positive or negative dispersion sub-length of a period. Where there is no sign associated with oscillation sub-length, the positive and negative oscillation sub-lengths are taken as equal.

However, magnitude of the total dispersion also has an impact upon phase separation and thus upon power penalty. Curve 66 in FIG. 3b shows the power penalty for a system identical to that shown in FIG. 3a, except that the sub-length is shorter, about 1 km, but the total dispersion magnitude is 1.5 ps/nm-km. Causing the waveguide total dispersion to make wider positive to negative swings reduces power penalty significantly, from 0.6 dB to less than 0.2 dB. The penalty difference of about 0.4 dB/120 km is large enough to be the difference between a functional and non-functional link, especially for long unregenerated links of 500 km or more.

Figure 4:
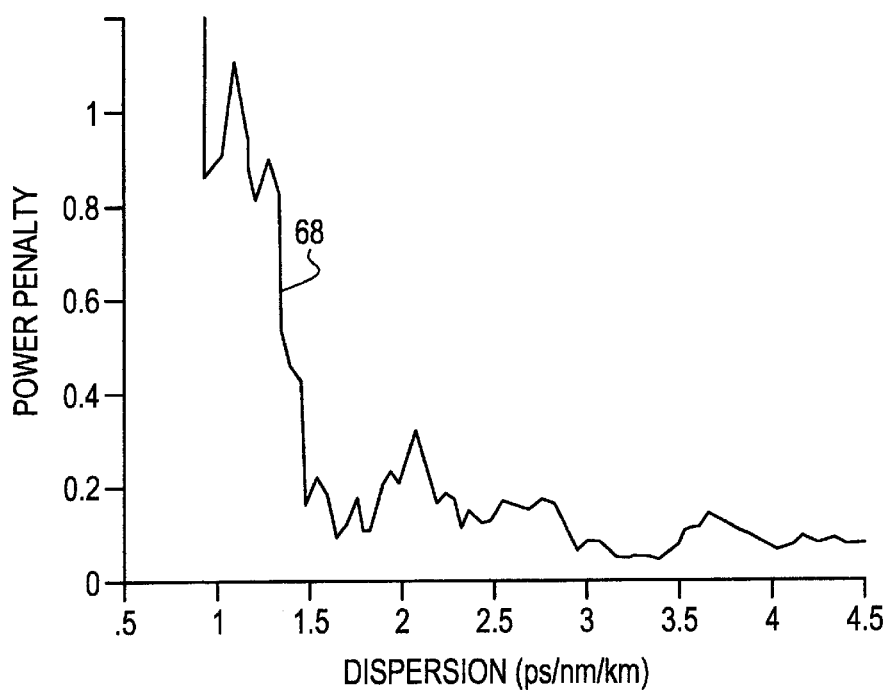
FIG. 4 is a chart of total dispersion vs. power penalty.

FIG. 4 is interpreted in essentially the same manner as FIGS. 3a and 3b. Curve 68 shows power penalty charted vs. total dispersion magnitude. The sub-length of the waveguide is chosen as about 1 km because the length of the shortest cables in general use is about 2 km. Again there are 8 channels having a frequency separation of 200 GHz, a total length of 120 km, and the input power is 10 dBm. Again the power penalty rises steeply when total dispersion magnitude falls below about 1.5 ps/nm-km.

Figure 5:
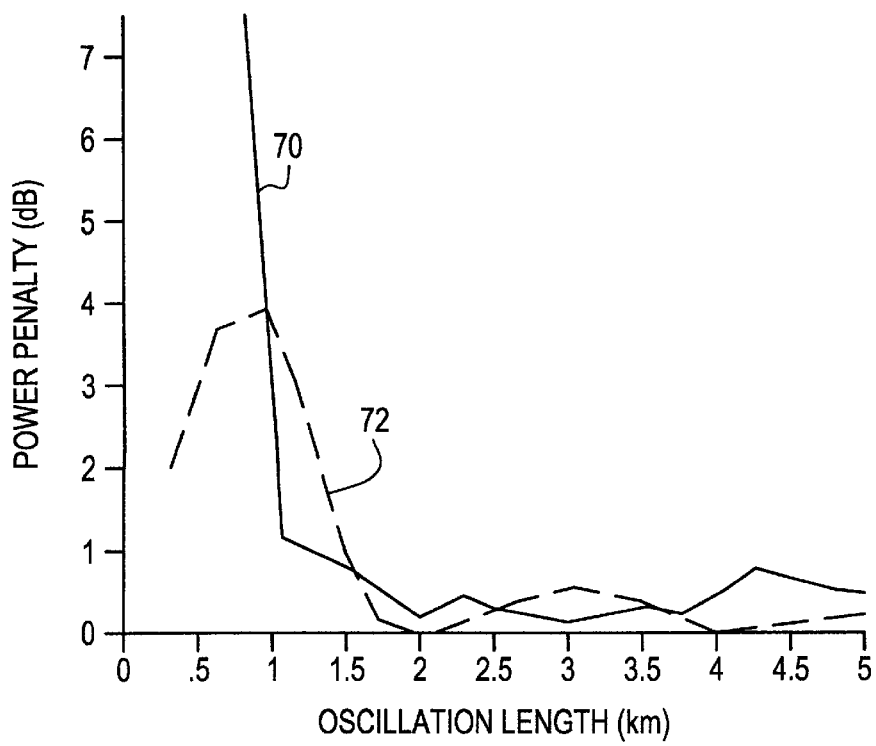
FIG. 5 is a chart of dispersion variation period length vs. power penalty.

System design is shown from another viewpoint in FIG. 5. In this case, the dispersion magnitude is fixed at 1.5 ps/nm-km. Curve 70 represents power penalty vs. sub-length magnitude for a system having 8 channels with 200 GHz frequency separation and 10 dBm input power. The length is chosen to be 60 dispersion sub-lengths and the sub-length is allowed to vary. Lower power penalties result when the sub-length is above 2 km. But with the relatively large total dispersion magnitude, little is gained by lengthening the sub-length beyond 2 km. Note the generally lower four wave mixing penalty paid when the number of channels used is reduced to 4 as shown by curve 72.

Another design consideration is the sharpness of the transition length over which the total dispersion changes sign. Here also, the signal phase separation is affected by the transition length. Thus, a shallow transition would cause the signal to travel a waveguide region of near zero total dispersion, and this adversely impacts power penalty caused by four wave mixing.

Figure 6:
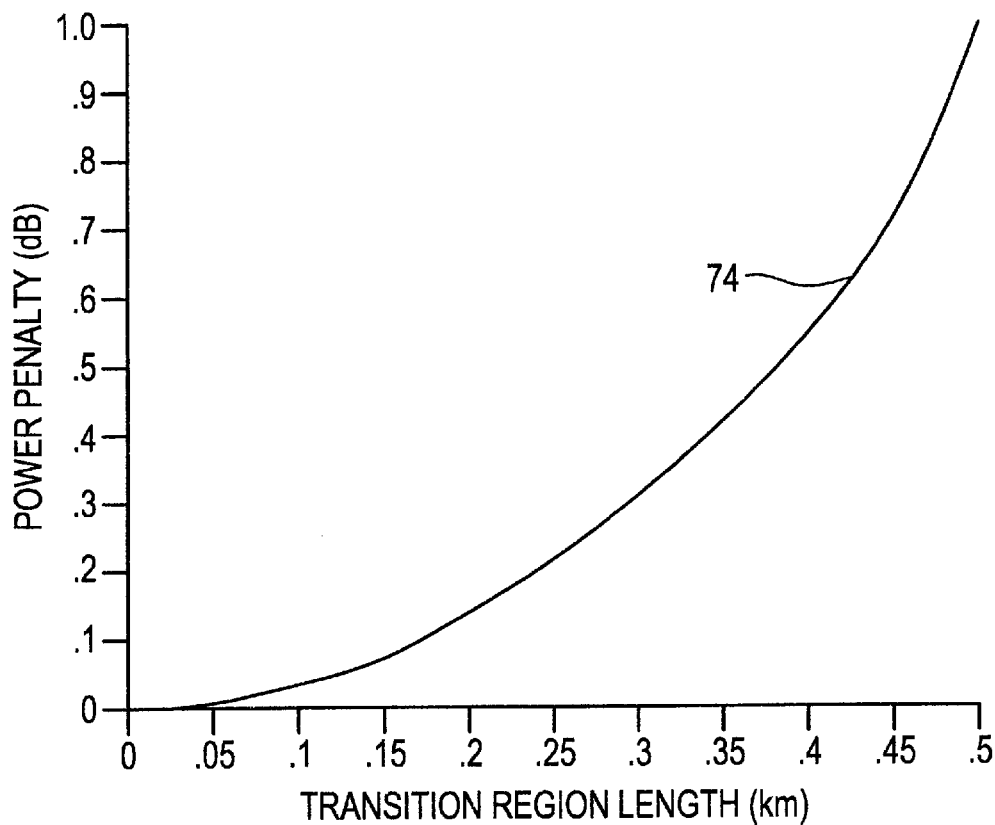
FIG. 6 is a chart of transition region length vs. power penalty.

The following example illustrates the effect of transition length on power penalty. Assume that the input power is 10 dBm. Four channels are used having a frequency separation of 200 GHz. The magnitude of total dispersion is 1.5 ps/nm-km and the oscillation sub-length of the total dispersion is taken to be 2 km. The chart of power penalty vs. transition length, shown as curve 74 in FIG. 6, shows that shorter transition lengths are preferred.

Fiber Fabrication

A method that produces very short transition regions is illustrated in FIGS. 7 and 8. To practice this method, core preforms can be prepared by any known process, but preferably they are prepared using chemical vapor deposition (CVD) methods, wherein the glass is deposited in a soot form, and thereafter heated and consolidated into a glass. While any such CVD method can be employed, examples of preferred CVD processes that can be employed to make the core preforms are outside vapor deposition (OVD), vapor axial deposition (VAD), modified chemical vapor deposition (MCVD) wherein a core layer is formed inside a glass tube, and plasma chemical vapor deposition (PCVD) wherein the reaction within the tube is plasma induced. The core preform can consist entirely of core glass or it can consist of a core region and a cladding region.

There is initially formed two or more cylindrical preforms that are capable of being overclad and formed into optical fibers having disparate optical characteristics. For most applications only two different types of core preforms are required; two preforms are utilized in the embodiment illustrated in FIGS. 7 and 8.

The first and second preforms are cut into tablets 81 and 82, respectively. Glass tablets, as used herein, means any glass component region which is assembled together with other glass component regions to form alternating sections of glass which vary with respect to one another in at least one optical characteristic or composition (dopant level).

Figure 27:
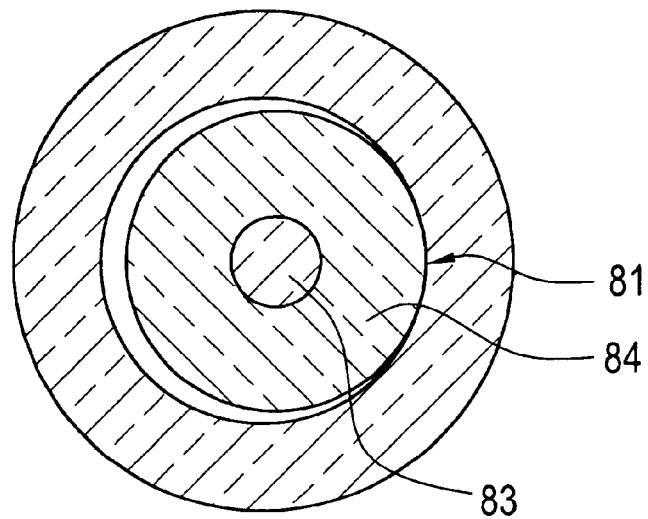
FIG. 27 is a cross-sectioned view of the assembly of FIG. 8 taken along section line 27.
Figure 28:
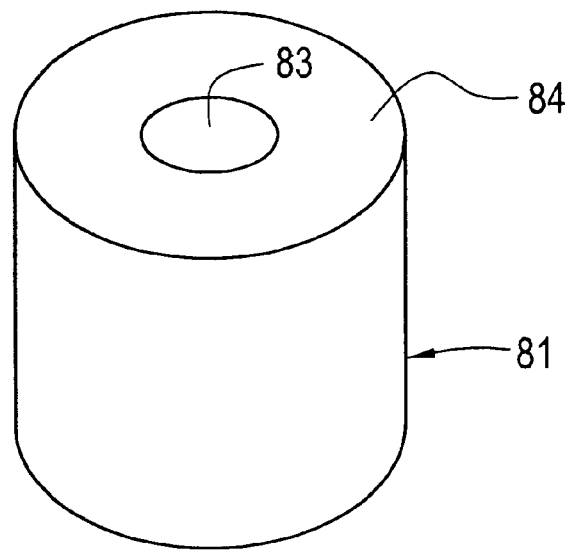
FIG. 28 is a perspective view of a tablet of FIG. 8 in accordance with the invention.

The lengths of the tablets depend upon the specific type of fiber being made. In the process of making DM fibers, the lengths of the tablets 81 and 82 are selected to yield in the resultant optical fiber the desired sub-lengths. The tablets can be made by the simple score and snap method. In an alternative embodiment, the tablets are formed by sawing tablets having desired lengths, for example, by using a diamond abrasive loaded wheel saw. The ends of the resultant tables are then polished. In one embodiment, illustrated in FIG. 8 and FIG. 27, tablet 81 has a core region 83 and a cladding region 84; tablet 82 has a core region 85 and a cladding region 86. A representative perspective view of tablet 81 including a core 83 and a cladding 84 is shown in FIG. 28. In this embodiment, the tablet 81 preferably comprises a donut shaped structure where the tablet 81 surrounds the rod shaped core 83. Tablet 83 (FIG. 8.) preferably comprises this same structure.

Figure 9:
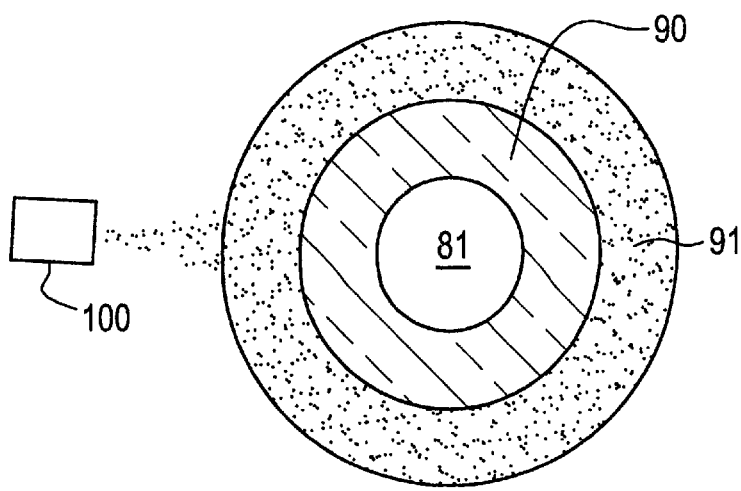
FIG. 9 illustrates the application of a layer of cladding glass particles to a tube.

A tubular glass handle 92 having an annular enlargement 97 is fused to one end of an elongated glass tube 90. Handle 92 is part of a ball joint type gas feed system of the type disclosed in U.S. Pat. No. 5,180,410. Enlargement 97 is adapted to rest on a slotted base of a support tube (not shown) that suspends handle 92 in a consolidation furnace. Tube 90 is heated and a dent 98 is formed near handle 92. Alternatively, that part of handle 92 adjacent tube 90 could be dented. The assembly including tube 90 and handle 97 is inserted into a lathe (not shown) and rotated and translated with respect to burner 100 which deposits on tube 90 a layer 91 of cladding glass particles or soot (see FIG. 9). Coating 91 can be built up to a sufficient outside diameter (OD) that the resultant preform can be consolidated and drawn into an optical fiber having the desired optical characteristics. Layer 91 can overlap handle 92 as shown in FIG. 7.

Tube 90 is oriented so that the end affixed to handle 92 is lower than the other end, and tablets 81 and 82 are alternately inserted into the upper end of tube 90. The tablets cannot fall beyond dent 98. Tube 90 is heated and a dent 99 is formed near that end opposite dent 98. When tube 90 is inverted, dent 99 prevents the tablets from falling from it.

Handle 92 is suspended from a support tube (not shown) which is lowered to insert assembly 94 into consolidation furnace muffle 95. While assembly 94 is heated in the consolidation furnace, a drying gas flows upwardly through the furnace (arrow 93). The drying gas conventionally comprises a mixture of chlorine and an inert gas such as helium. A chlorine-containing gas stream (arrow 96) is flowed from tube 92 into tube 90. Although gas stream 96 could contain a diluent such as helium, pure chlorine is preferred for cleaning purposes. Since the diameter of each of the tablets 81 and 82 is slightly smaller than the inner diameter of tube 90, the chlorine flows downwardly around the entire periphery of each of the tablets; it also flows or diffuses between adjacent tablets. The chlorine then exhausts through the bottom of tube 90. The chlorine functions as a hot chemical cleaning agent. During this hot chlorine cleaning step, the temperature is below the consolidation temperature of soot coating 91 so that the space between tablets 81 and 82 and tube 90 remains open for a sufficient length of time for the required cleaning to occur. The chlorine cleaning step is more effective at high temperatures. It is preferred that the temperature of the cleaning step be at least 1000° C., since at lower temperatures, the duration of the step would be sufficiently long that the step would be undesirable for commercial purposes. Obviously, lower temperatures could be employed if processing time were not a concern. The flow of hot chlorine between the tube 90 and tablets 81 and 82 is very beneficial in that it allows the surfaces of adjacent tablets and of tube and tablets to be brought together without the formation of seeds at their interface. Seeds include defects such as bubbles and impurities that can produce attenuation in the resultant optical fiber.

While assembly 94 is lowered further into the furnace muffle, the wall of that portion of tube 90 at the end of soot layer 91 collapses and fuses together, thereby cutting off the centerline chlorine flow. As an optional step, a valve can then be switched to pull a vacuum within tube 90. As assembly 94 continues its movement into the furnace muffle, first its tip and then the remainder of the assembly is subjected to the maximum furnace temperature which is sufficient to sinter coating 91. Soot coating 91 shrinks both radially and longitudinally as it sinters.

As soot coating 91 shrinks longitudinally, it causes tube 90 to decrease in length. This causes adjacent tablets 81 and 82 to be forced together while they are subjected to sintering temperature, whereby they fuse together without forming seeds. Without this longitudinal shrinking of tube 90, adjacent tablets could not become sufficiently fused to form low loss optical fibers.

Figure 10:
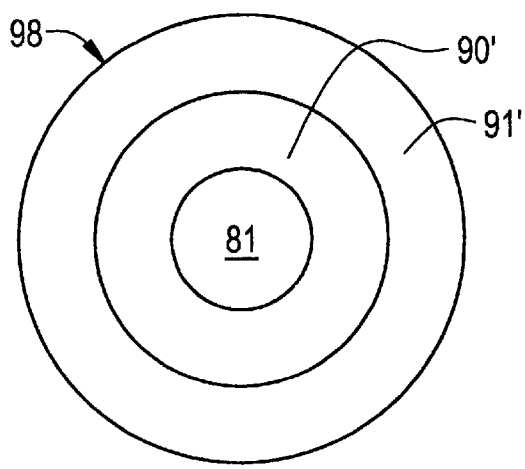
FIG. 10 is a cross-sectional view of the fused assembly resulting from the consolidation/fusion step illustrated in FIG. 7.

As soot coating 91 shrinks radially, it exerts a force radially inwardly on tube 90. This urges tube 90 inwardly against tablets 81 and 82 to form a fused assembly 98 (see FIG. 10) in which the three regions 81, 90' and 91' are completely fused. Region 90' is the collapsed tube, and region 91' is the sintered porous coating. A relatively low density soot provides a greater inwardly directed force; however, the soot coating must be sufficiently dense to prevent cracking.

The consolidation of the tablet-filled overclad tube to yield a seed free preform is a crucial processing step. For the tablets to fuse together without seeds, it is necessary to flow chlorine through the tube to chemically clean all the surfaces. While the step of applying vacuum after the blank tip fuses may not always be necessary, it is in many embodiments preferred, as this step seems to greatly facilitate formation of fiber having low attenuation, particularly at the interface between adjacent glass component or tablet regions.

The fused assembly is removed from the consolidation furnace. Regions 90' and 91' of fused assembly 98 function as cladding in the resultant optical fiber. Assembly 98 can be used as a draw blank and can be drawn directly into an optical fiber. Fused assembly 98 can optionally be provided with additional cladding prior to the fiber drawing step. For example, a coating of cladding soot can be deposited onto assembly 98 and then consolidated. Alternatively, assembly 98 can be inserted into a cladding glass tube. If additional cladding were added, the diameters of the core regions of tablets 81 and 82 would have to be suitably adjusted.

As compared to fusing the core canes or tablets prior to inserting them into a cladding glass tube, the present method is simple to perform, and it enables the fusion to be carried out in a dry environment. The method is self aligning in that adjacent core canes of different diameter will be centered on the axis of the resultant draw blank when tube 90 collapses inwardly during the sintering of porous glass coating 91.

The method of this invention brings new degrees of freedom in the tailoring of fiber properties. It results in the formation of optical fibers having adjacent regions or lengths of disparate properties. Very abrupt transition regions connect the adjacent fiber lengths. The attenuation of this fiber is identical to that of standard long distance telecommunication fiber, i.e. less than 0.25 dB/km and preferably less than 0.22 dB/km.

Figure 11:
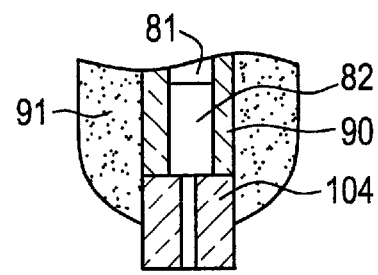
FIG. 11 is a partial cross-sectional view of a modification of the embodiment of FIG. 7.

In the embodiment shown in FIG. 11, dents 98 and 99 are not formed in tube 90. A short length 104 of glass capillary tubing is fused to one end of tube 90, and the glass handle is fused to the opposite end of tube 90. Tablets 81 and 82 are inserted through the handle and into tube 90. The tablets cannot fall beyond tube 104 since that tube has a relatively small bore. When the assembly is lowered into the consolidation furnace to initiate the sintering process, tube 104 initially fuses to cut off the chlorine flow.

In the present invention, these glass tablets are preferably formed using chemical vapor deposition methods. Thus, glass soot is deposited by CVD, after which the glass soot is consolidated into a relatively void-free glass. The resultant glass may then be cut into tablets 81 and 82 having a desired composition, shape and size, and assembled inside the tube 90 as desired. By using chemical vapor deposition techniques to form the glass, it is possible to form glass tablets having complex index of refraction profile, by varying the amount or type of dopant deposited during the CVD soot deposition process.

For example, in the embodiment just described, tablets 81 and 82 can be constructed to have different index of refraction profiles. In one such preferred embodiment, tablets 81 and 82 are made from glass rods which were formed using OVD methods in which the amount of and type of dopant added during the soot deposition step or a subsequent soot doping step is selected to result in a particularly desired refractive index profile. The resultant soot glass preforms are then heated and consolidated into glass rods.

Figure 14:
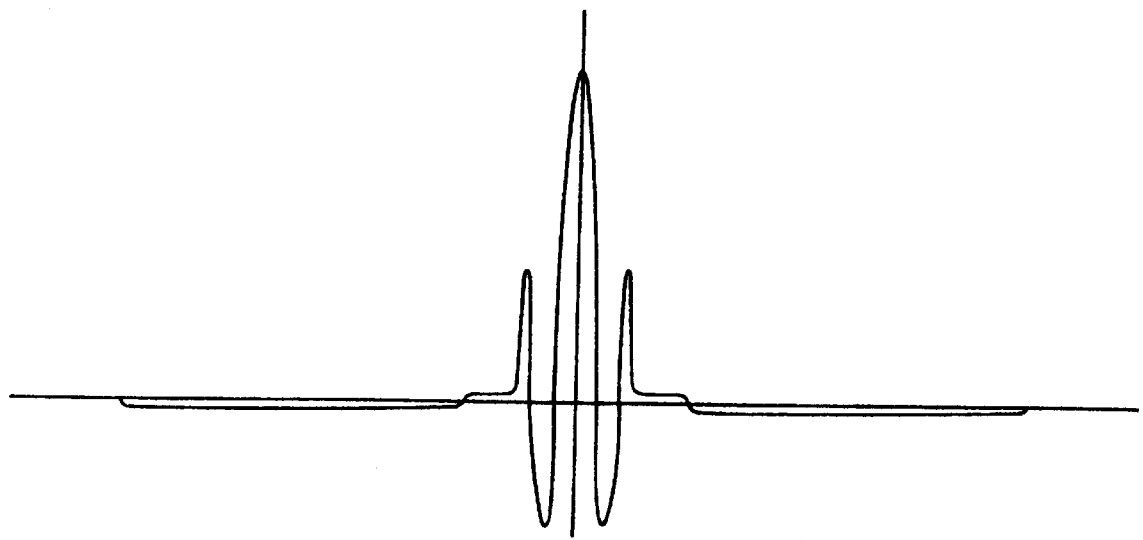
FIGS. 14 and 15 illustrate exemplary alternating index of refraction profiles which may be formed along a single optical fiber using the methods of the present invention to facilitate controlling dispersion characteristics over a wide wavelength range.
Figure 15:
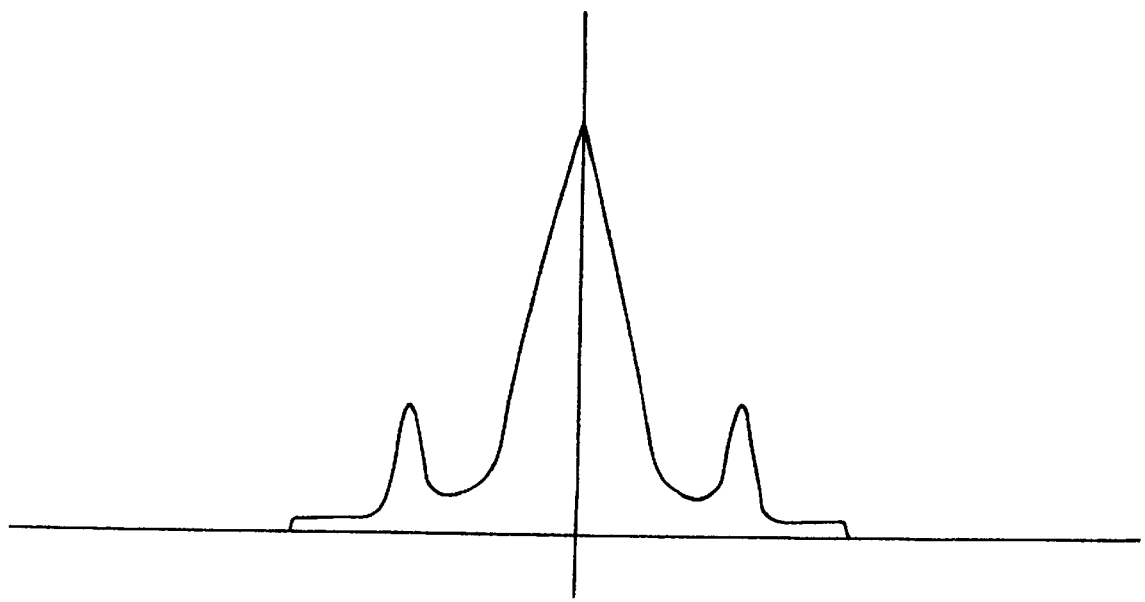

In one embodiment, glass tablets 81 and 82 are assembled which have index of refraction profiles similar to those illustrated in FIGS. 14 and 15, respectively. The first rod, the profile of which is illustrated in FIG. 14, has an index of refraction profile which, when described from the axis outward, comprises a high index central core region having index $n_1$, followed by a fluorine doped "moat" region having index $n_2$ which is less than index $n_1$ and has an index less than pure $SiO_2$, followed by a third region having an index $n_3$ which is in between that of index n1 and $n_2$. This may optionally be followed by a cladding region which is comprised substantially of $SiO_2$, but may be slightly up-doped or down-doped.

The second rod, the profile of which is illustrated in FIG. 15, has an index of refraction profile which, when described from the axis outward, comprises a high index central core region having index $n_1$, followed by a "moat" region having index $n_2$ which is not less than SiO2, followed by a third region having an index $n_3$ which is intermediate between that of index $n_1$ and $n_2$. This may optionally be followed by a cladding region which is comprised substantially of SiO2, but which may be slightly up-doped or down-doped.

Cylindrically shaped glass tablets 81 are then cut from the first rod and cylindrically shaped glass tablets 82 are cut from the second rod. Tablets 81 and 82 having index of refraction profiles as illustrated in FIGS. 14 and 15, respectively, may then be inserted into tube 90 as described above in alternating fashion. This embodiment is particularly useful for forming fibers having alternating sections of positive dispersion having a positive slope (vs. wavelength) and negative total dispersion having a negative slope. When operated near, but not at, the zero dispersion wavelength, such fibers having been constructed which exhibit total attenuations of less than 0.5 dB/km. If desired, additional glass soot (doped or undoped) can then be deposited onto the assembly which includes tube 90 and tablets 81 and 82, for example if additional cladding is desired.

Figure 17:
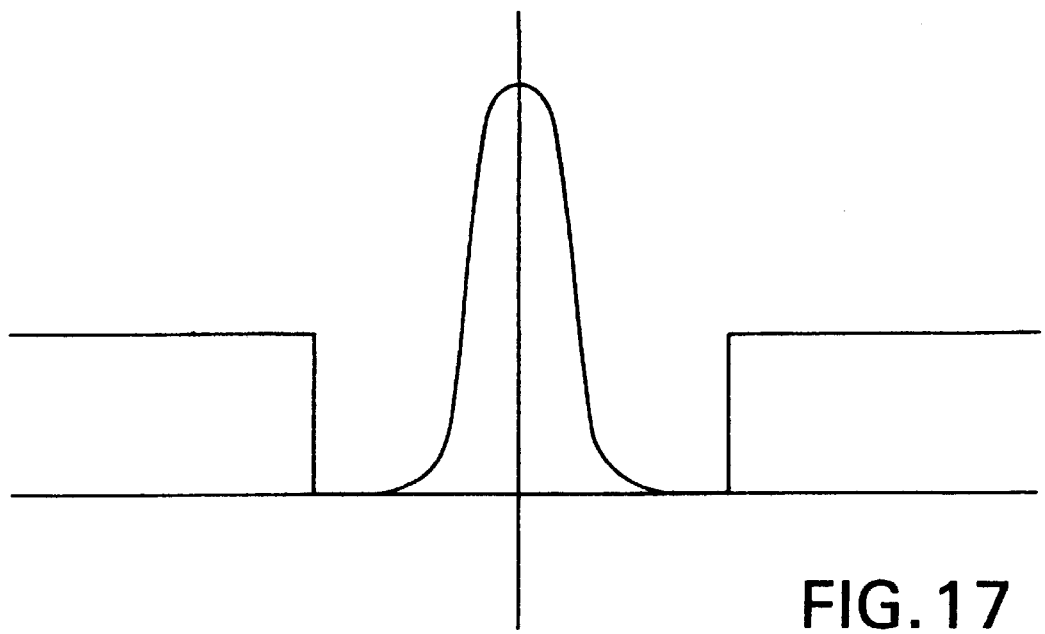
FIGS. 17 and 18 illustrate alternative exemplary alternating index of refraction profiles which may be formed along a single optical fiber using the methods of the present invention.
Figure 18:
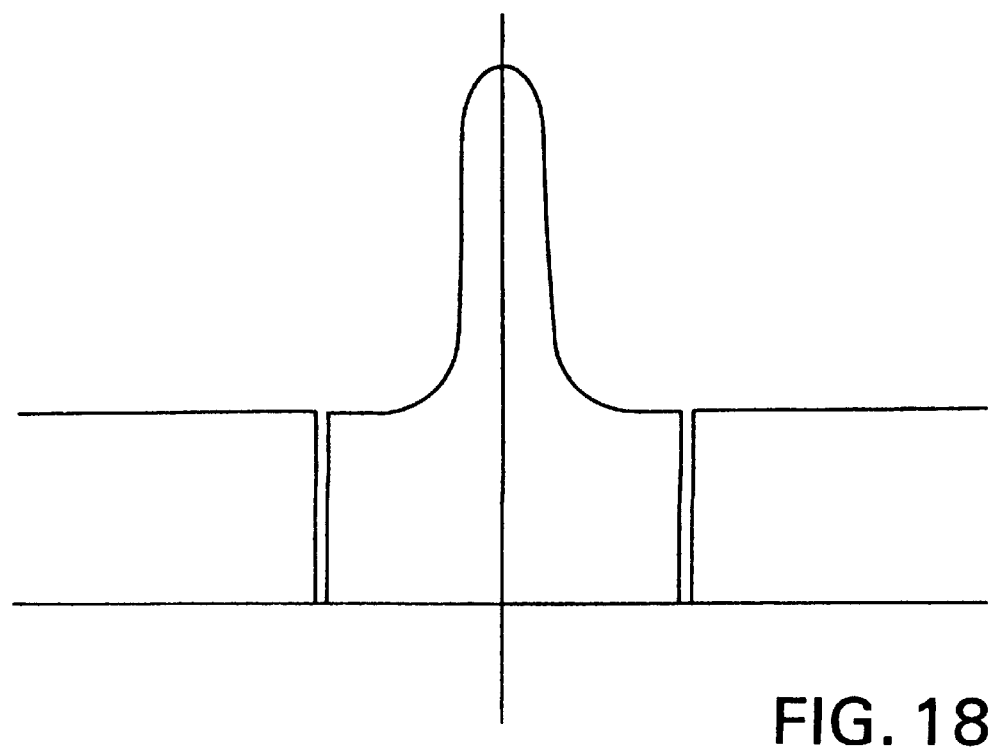

In an alternative embodiment, glass tablets 81 and 82 are assembled which have index of refraction profiles similar to those illustrated in FIGS. 17 and 18. The first rod, the profile of which is illustrated in FIG. 17, has an index of refraction profile which, when described from the axis outward, comprises a high index central core region having index $n_1$, followed by a lower index "moat" region having index $n_2$ which is less than index $n_1$. In the embodiment illustrated the first high index region is comprised of $SiO_2$ doped with $GeO_2$, and the lower index of the lower index region is at or about the index of refraction of pure silica. This may optionally be followed by an additional cladding region which is comprised substantially of $SiO_2$, but may be slightly up-doped or down-doped. The presence of a lower index moat region within the core region is particularly preferred in order to form regions having negative dispersion having negative dispersion slope.

The second rod has an index of refraction profile which, as illustrated in FIG. 18, when described from the axis outward, comprises a high index central core region having index $n_1$, followed by a lower region having index $n_2$ which is not less than $SiO_2$. In the embodiment illustrated the first high index region is comprised of $SiO_2$ doped with $GeO_2$ (of course, any other dopant selected to increase the index of refraction to greater than that of $SiO_2$ may be employed instead of $GeO_2$), and the lower index of the lower index region is also comprised of $SiO_2$ doped with $GeO_2$, but with less dopant that the high index region. In the embodiment illustrated, a trough is present in the region corresponding to $SiO_2$ tube 90 used to assemble the tablets 81 and 82. This trough index region is not expected to have much impact on the fiber performance. Of course, if desired, a $GeO_2$ doped $SiO_2$ tube could be employed which matches the index of the second lower index region, thereby avoiding formation of the index trough altogether. This may optionally be followed by a cladding region which is comprised substantially of $SiO_2$, but which may be slightly up-doped or down-doped.

Cylindrically shaped glass tablets 81 are then cut from the first rod and cylindrically shaped glass tablets 82 are cut from the second rod. Tablets 81 and 82 having index of refraction profiles as illustrated in FIGS. 17 and 18, respectively, may then be inserted into tube 90 as described above in alternating fashion. As illustrated in FIGS. 17 and 18, the tube is then overcladded with an additional layer of $GeO_2$ doped $SiO_2$ which matches the index of the second lower index region in FIG. 18. This overcladding serves as the clad region for the fiber.

This embodiment is particularly useful for forming fibers having alternating sections of positive dispersion having a positive slope (vs. wavelength) and negative total dispersion having a negative slope. It is also advantageous in that it avoids the use of expensive fluorine doping. When operated near, but not at, the zero dispersion wavelength, such fibers having been constructed which exhibit total attenuations of less than 0.5 dB/km. If desired, additional glass soot (doped or undoped) can then be deposited onto the assembly which includes tube 90 and tablets 81 and 82, for example if additional cladding is desired.

Figure 16:
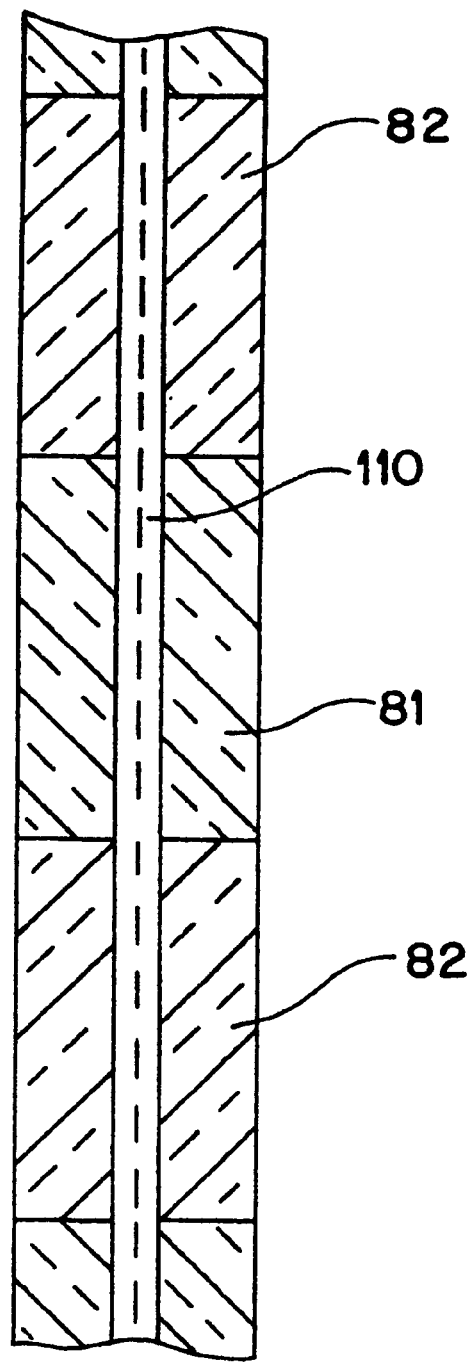
FIG. 16 illustrates an alternative method in accordance with the present invention.

Of course, the invention can be carried out in alternative and additional manners. For example, rather than inserting tablets into a tube, ring or donut shaped tablets 81 and 82 could be employed and located along a rod 112, as illustrated in FIG. 16. For example, to formulate a fiber preform similar to the one formed in the example set forth immediately hereinabove, rather than assembling alternating glass tablets 81 and 82 inside a tube, a single glass rod having index $n_1$ can be used to form the high index central core region (this could be, for example, Ge-doped $SiO_2$. In this manner, a rod having continuous, relatively uniform composition along its length may be employed to form a high index inner core portion, and the donuts employed to form lower or different outer core portions of the core refraction index profile. The resultant assembly 112, which includes rod 112 and donut shaped tablets 81 and 82, can then be consolidated and/or have additional glass applied by CVD as desired.

Figure 19:
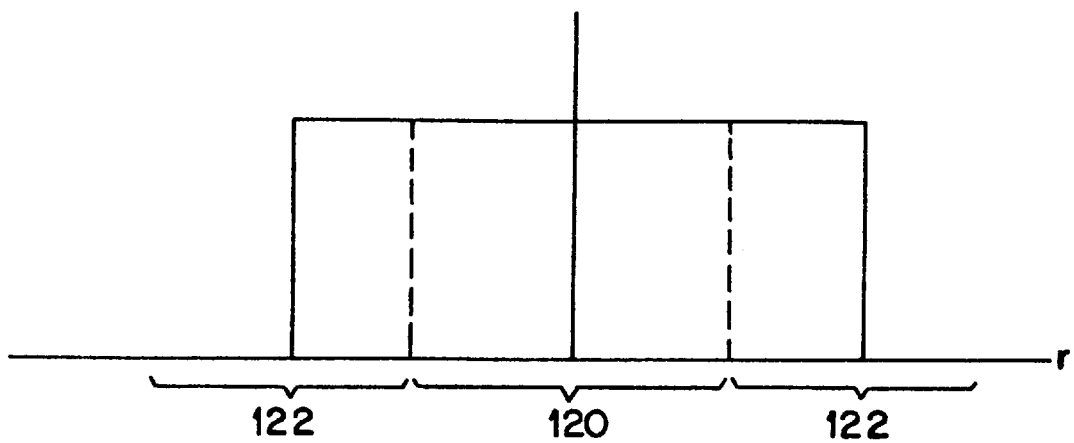
FIGS. 19 and 20 illustrate alternative exemplary alternating index of refraction profiles which may be formed along a single optical fiber using the methods of the present invention.
Figure 20:
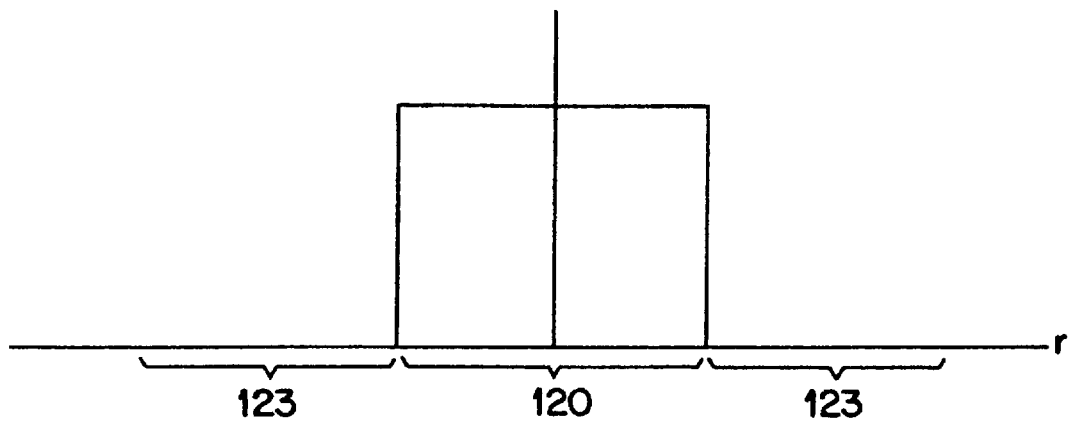

In an alternative embodiment, glass tablets 81 and 82 are assembled which have index of refraction profiles similar to those illustrated in FIGS. 19 and 20. This combination can be used to form a step index fiber, which for example, has a diameter of ~125 μm and alternates between segments consisting of step design with a delta of ~0.5% and a core diameter equal to about 8 μm followed by a segment with same delta but with core diameter equal to about 4 μm. Such a design would result in alternating sections having widely differing dispersions of negative and positive magnitude, respectively. Such a dispersion managed fiber can be fabricated by assembling pellets of two different core canes inside a tube, as described above. Such pellets could be sliced or diced using a saw, and afterwards polished using flame polishing or mechanical polishing techniques. Alternatively, this type of fiber can be used using the process illustrated in FIG. 16, wherein donut shaped tablets 81 and 82 are assembled onto a core cane 110.

In this case, a single continuous core cane of appropriate diameter may be employed to assemble the donut shaped tablets 81 and 82. In this embodiment, core cane 110, which has the index profile 120 illustrated in FIGS. 19 and 20, will form part of the final core when the blank is fully assembled. Tablets 81 and 82, which have index profiles 122 and 123, respectively (again as illustrated in FIGS. 19 and 20), are diced into sizes that fit snuggly (preferably with enough clearance between components to enable cleaning via a cleaning gas such a chlorine) onto central core cane 110, and are assembled thereon to make up the alternate sections of the DMF. Tablet 82 is made of pure silica in this example. A blank assembled in this fashion alternates between the profiles illustrated in FIGS. 19 and 20 and would result in alternating sections having widely differing dispersions of negative and positive magnitude, respectively. After the core cane is assembled in this fashion, more soot is preferably deposited to finish the outer cladding portion of the predraw blank. The blank is then consolidated to form a blank for making dispersion managed fiber. Prior to or during the consolidation process, the tablets 81 and 82 and core 110 are preferably exposed to a cleaning step employing chlorine. Vacuum can be applied to facilitate complete radial fusing of the tablets 81 and 82 to the central core 110 as well as longitudinally to each other. There are a number of advantages to this assembly/fabrication process. First is that the majority of the core is made of continuous cane and is not exposed to tablet forming processes which may impart contaminants. Second is that, using dicing or sawing techniques, tablets 81 and 82 may be thin (e.g. having an aspect ratio of the outer diameter of the donut or tube to the thickness of the donut is greater than 1, more preferably greater than 5). This enables the formation of small (e.g. less than 5, more preferably less than 2, and most preferably less than 1 km) period dispersion managed fibers. The cleaning process prior to fusing or consolidation helps to eliminate contaminants between surfaces in the tablet/core rod assembly, particularly in the polished areas to eliminate the contaminants. In addition, any contaminant on these sleeved sections is away from the core center where the mode intensities are higher. Another advantage is that bigger core canes can be made using this process. Also, the sleeves can be cut with non-contaminating processes like water-jet cutting or $CO_2$ laser cutting. One of the drawbacks of this approach is that the designs cannot be completely arbitrary. Alternate sections preferably have significant profile overlaps in the central part of the core. But this limiting is not very critical, since variations of the above concept can be used to generate a variety of profiles.

Figure 22:
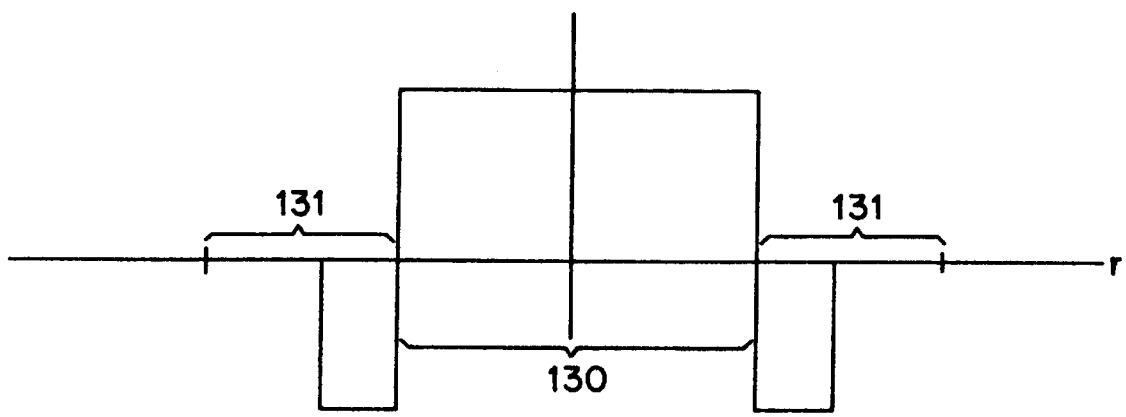
FIGS. 21 and 22 illustrate alternative exemplary alternating index of refraction profiles which may be formed along a single optical fiber using the methods of the present invention.
Figure 21:
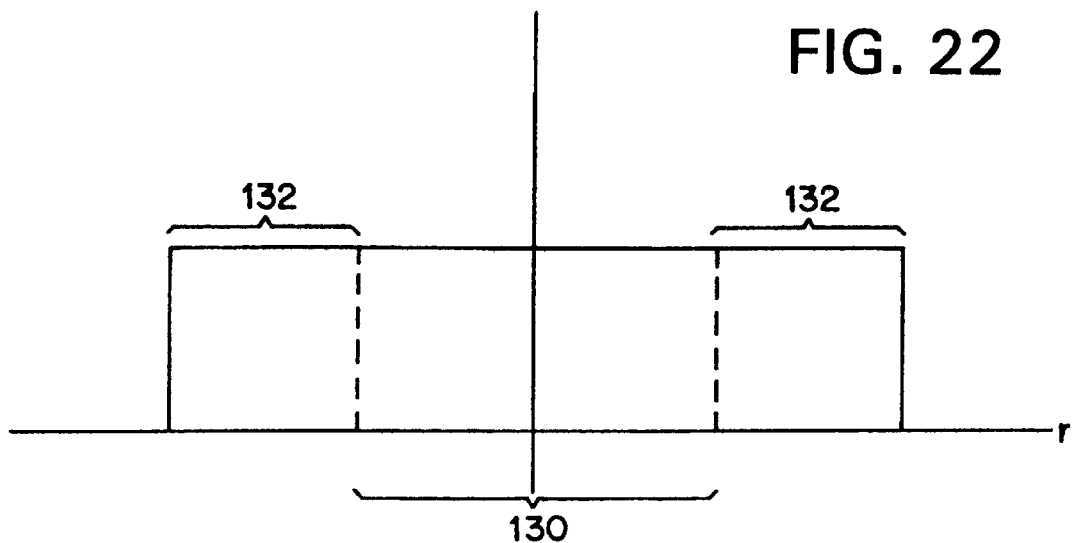

For example, in an alternative embodiment, glass tablets 81 and 82 are assembled which have index of refraction profiles similar to those illustrated in FIGS. 21 and 22, respectively, to form alternating sections having significantly different dispersion. In this case, the central continuous cane still has a delta of about 0.5% step profile. As above, tablet 81 has a delta ~0.5% profile 132 shown in FIG. 21 to generate a fiber having a step index core of about 8 $\mu$m diameter and zero dispersion in the 1300 nm window. Tablet 82 has a depressed index profile 131 as shown in FIG. 22 leading to a w-type profile with dispersion zero around 1630 nm and a dispersion slope of 0.025 ps/km.nm$^2$. This simple example shows the capability of this approach to not only achieve alternating sections of widely separated positive and negative dispersions, but which also have low slopes useful for wide operating wavelength ranges in the 1300–1620 nm range, and especially useful in the 1550 nm operating window (e.g. 1525–1565 nm).

Figure 23:
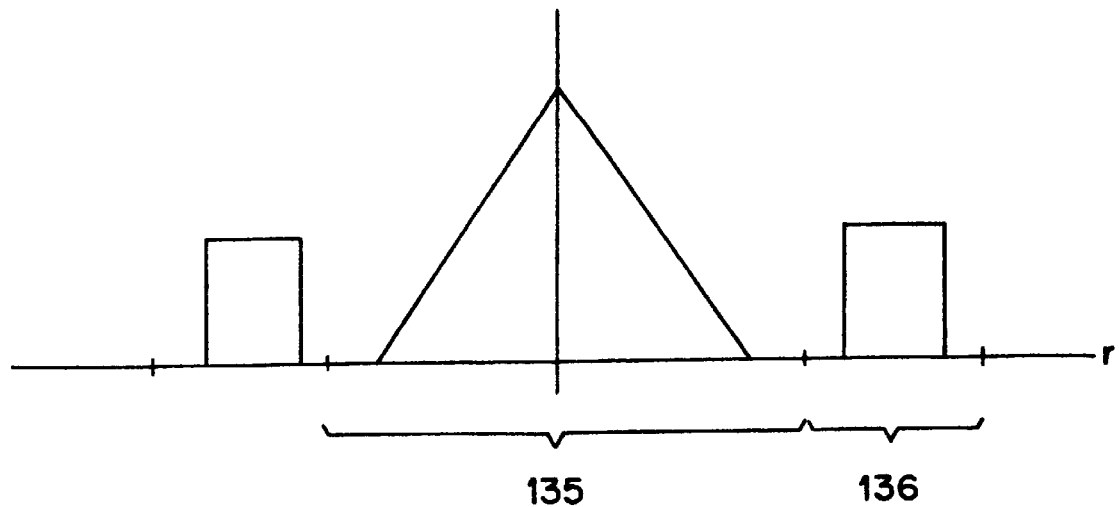
FIGS. 23 and 24 illustrate alternative exemplary alternating index of refraction profiles which may be formed along a single optical fiber using the methods of the present invention.
Figure 24:
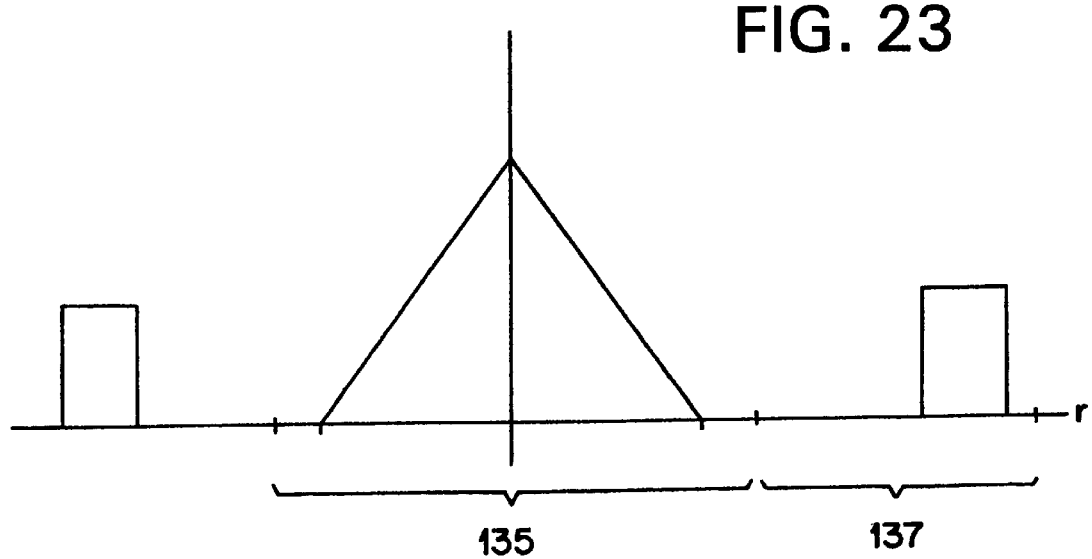

A still further alternative embodiment involves assembling glass tablets 81 and 82 which have index of refraction profiles similar to those illustrated in FIGS. 23 and 24, respectively. In this embodiment, two different triangular segmented core designs are employed. The index profile 136 for donut-shaped tablet 81 illustrated in FIG. 23 leads to a 1300 nm zero dispersion wavelength and FIG. 24 for longer zero dispersion wavelength designs (e.g. 1600 or higher). This example illustrates the flexibility of this fabrication approach where the central core is common, but the ring location, its delta, and width are different for the alternating sections. This example also illustrates another aspect of the disclosure wherein the interface between the central core cane and the sleeve can be set based on process requirements. For example, the separation can be in the silica moat area as shown in FIGS. 23 and 24 near the ring location with germania doped silica. For processing ease (seed formation), and heat aging considerations, this flexibility is quite useful.

Figure 25:
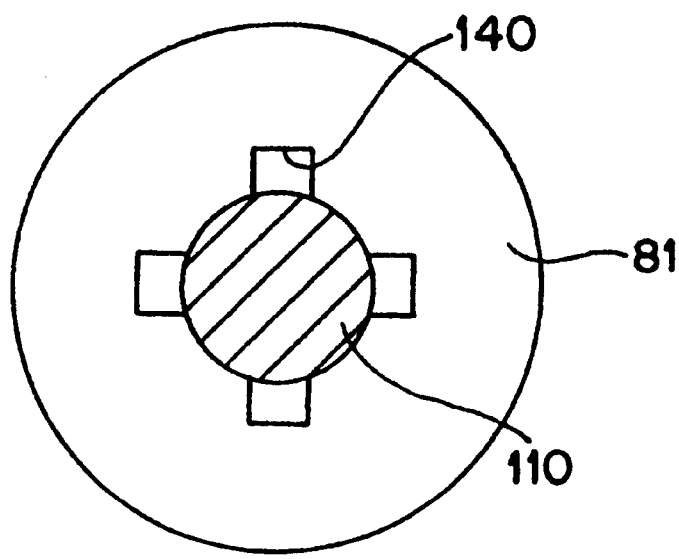
FIGS. 25 and 26 illustrate alternative exemplary alternating index of refraction profiles which may be formed along a single optical fiber using the methods of the present invention.
Figure 26:
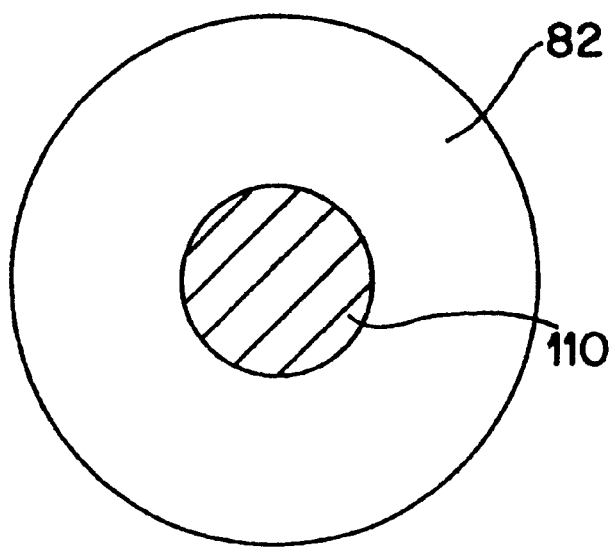

Another variation of the invention involves assembling donut shaped sections 81 having axial grooves 140 which are serrated into locations around the inner peripheral surface of the donut shaped tablet 81, as shown in FIGS. 25 and 26. The serrations can be made using a dicing saw or by cutting with non-contaminating $CO_2$ laser. Alternatively, the grooves can be made in the central continuous core cane also. Because of these voids, consolidation and fiber draw preferably is done under special conditions. For example, the draw should be done at low enough temperatures that the voids do not collapse during draw. The dispersion values of the sections having voids will be significantly different compared to the sections without voids. By making the cross sections of these serrations very narrow and short and traveling the length of the tablet, it should also be possible to draw them without the voids collapsing. This enables the periodicity of the dispersion managed fiber to be quite small, on the order of a few meters if need be. Also, other interesting properties, such as for example, polarization control, may be combined with dispersion management in these fibers by the design of voids/serration's in the azimuthal direction.

Of course, it is not necessary that all of the process steps described in the above embodiments be conducted in exactly the same sequence as is described above. For example, in the embodiment described above, in which cylindrical tablets 81 and 82 are inserted into a glass tube 90, if desired, layer 91 of cladding glass particles or soot may be deposited onto tube 90 prior to the tablets 81 and 82 being deposited into the tube 90. Coating 91 could then again be built up to any sufficient outside diameter that will result after consolidation and fiber draw into an optical fiber having the desired optical characteristics. In this embodiment, the tube and soot assembly is preferably consolidated prior to the tablets 81 and 82 being deposited within tube 90, in which case the soot layer 91 and tube 90 may be cleaned and consolidated, for example, by using the cleaning and consolidation techniques discussed above. Alternatively, tablets 81 and 82 may be inserted into the tube 90 prior to the resultant assembly being consolidated. Preferably, one end of tube 90 is closed off and a vacuum is applied to the other end of the tube 90, as was discussed above. This embodiment results in a heavier walled silica tube within which the tablets 81 and 82 may be deposited. Of course, rather than starting with a relatively thin walled tube and depositing soot thereon, a thicker silica walled tube could be employed if desired, and the soot deposition step avoided entirely.

Prior to any of the consolidation steps or the step of fusing the tablets 81 and 82 with tube 90, the cleaning operations discussed above are also preferably applied to the resultant assembly.

In another alternative embodiment, tablets 81 and 82 are again deposited into a silica tube 90, as was discussed above. However, prior to deposition of the soot layer 91, the tablets in tube 90 are redrawn. This may be done, for example, by exposing the assembly which consists of tube 90 and tablets 81 and 82 to a temperature sufficient to consolidate and fuse the tablets 81 and 82 in tube 90 into a monolithic, seed-free preform, and then drawing the resultant precursor or preform into a somewhat thinner diameter. The resultant consolidated preform may then be overclad with soot, if desired, to achieve any particular desired amount of additional glass prior to having the resultant preform drawn into a fiber.

Forming DM Fibers

A dispersion managed fiber is formed from core preforms that are capable of forming single-mode optical fibers having different zero dispersion wavelengths. The dispersion of a waveguide length can be changed by varying various waveguide parameters such as geometry, refractive index, refractive index profile, or composition. Any of a large number of refractive index profiles provide the required flexibility for adjusting waveguide dispersion and thereby varying the total dispersion. These are discussed in detail in U.S. Pat. No. 4,715,679, Bhagavatula, and applications Ser. Nos. 08/323,795, 08/287,262, and 08/378,780, the specifications of which are all hereby incorporated by reference.

Figure 12:
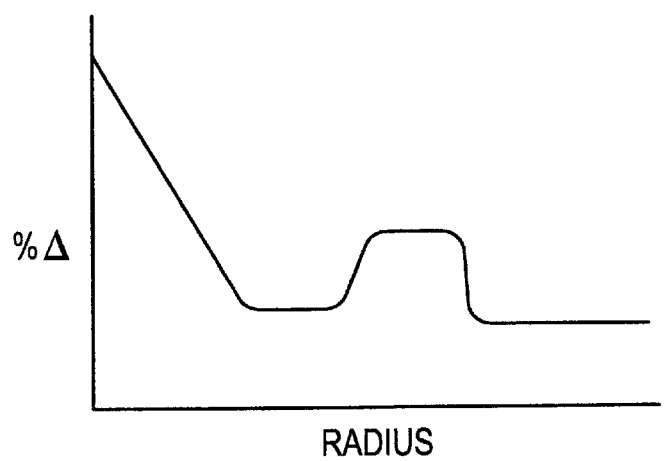
FIGS. 12 and 13 are refractive index profiles of dispersion shifted optical fibers.
Figure 13:
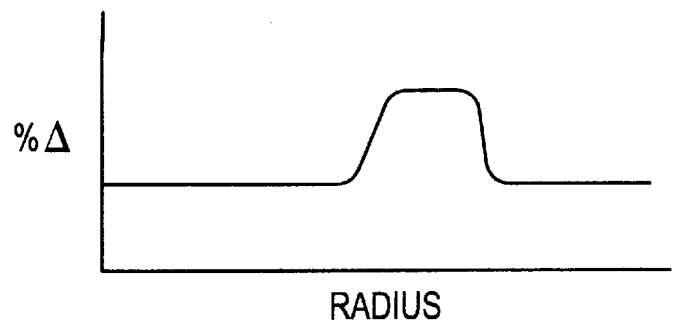

One type of refractive index profile which is useful for forming optical fibers having zero dispersion at predetermined wavelengths is that having a relatively high index central region surrounded by an annular region of depressed index which is in turn surrounded by an outer annular region of index higher than that of the depressed index region (see FIG. 12). The index profile of another embodiment (see FIG. 13) includes an essentially constant index central portion having a refractive index substantially equal to the clad glass refractive index and an adjacent annular region of increased refractive index. Optical fibers having this type of refractive index profile can be easily manufactured.

A simple DM fiber refractive index profile is the step index profile. Two core preforms could be formed of the same core and cladding materials, the radius of one core region being larger than that of the other. The draw blank is drawn to a fiber having lengths of a first core radius interspersed between lengths of a second core radius that is larger than the first radius. A core diameter difference of about 5% to 25% is sufficient to produce the desired positive to negative dispersion variation. A range of core radii variation of 5% to 10% is, in general, sufficient for most applications.

The following example describes the formation of a single-mode DM fiber suitable for providing zero dispersion at 1545–1555 nm. Two different core preforms were made by a method similar to that disclosed in U.S. Pat. No. 4,486,212 which is incorporated herein by reference. Briefly, the method of that patent includes the steps of (a) depositing glass particles on a mandrel to form a porous glass preform, (b) removing the mandrel and consolidating the porous preform to form a dry, sintered preform, (c) stretching the sintered preform and closing the axial aperture therein. The core preform included a central region of core glass surrounded by a thin layer of cladding glass. Both of the core preforms had core refractive index profiles of the type shown in FIG. 12. The first core preform was such that if it were provided with cladding and drawn into a single-mode fiber having a 125 μm OD, it would exhibit zero dispersion at 1520 nm. The second preform is such that if it were similarly formed into a 125 μm OD single-mode fiber, its zero dispersion wavelength would be 1570 nm. The core preforms were stretched to diameters of 7 mm and 7.1 mm. The first and second stretched preforms were scored and snapped to form tablets 81 and 82 of substantially equal length. Tablets 81 had core regions 83 and cladding regions 84; tablets 82 had core regions 85 and cladding regions 86.

A one meter length of silica tube 90 was employed; it had an inside diameter (ID) of 7.5 mm and an O.D. of 9 mm. The technique described in conjunction with FIG. 7 was employed to load tablets 81 and 82 into tube 90. Coating 91 was built up to a sufficient OD that the resultant preform could be consolidated and drawn into a 125 μm OD single-mode fiber.

The resultant assembly 94 was suspended in a consolidation furnace. While assembly 94 was rotated at 1 rpm, it was lowered into consolidation furnace muffle 95 at a rate of 5 mm per minute. A gas mixture (arrow 93) comprising a 50 sccm chlorine and 40 slpm helium flowed upwardly through the muffle. A centerline flow of 0.3 slpm chlorine flowed downwardly around tablets 81 and 82 and exhausted from the bottom of tube 90. The maximum temperature in the consolidation furnace was about 1450° C. As assembly 94 moved downwardly into the furnace, the centerline chlorine flow chemically cleaned the surfaces of tablets 81 and 82 and the inner surface of tube 90. As assembly 94 moved further into the furnace muffle, that region of tube 90 below the tablets fused and cut off the centerline chlorine flow. A valve (not shown) was then switched to pull a vacuum within tube 90. Assembly 94 continued its movement into the furnace muffle, and coating 91 was sintered. Tube 90 was forced inwardly against tablets 81 and 82, and the contacting surfaces of all of the glass elements became fused. As soot 91 sintered, tube 90 became shorter, and seed-free fused joints were formed between adjacent tablets.

After being removed from the consolidation furnace, draw blanks formed by this process were drawn to form DM optical fibers having an OD of 125 μm. Single-mode DM optical fibers made by this process have been drawn without upsets; attenuation has typically been 0.21 dB/km or less. This is the same attenuation that would have been exhibited by a single-mode dispersion shifted optical fiber drawn from a preform formed by overcladding one of the 7 mm core canes.

The two different types of tablets that were employed in the fiber making process combined to provide a zero dispersion wavelength of 1545–1555 nm. The zero dispersion wavelength was determined by the total lengths of each kind of core in the fiber. The zero dispersion wavelength of the fiber could be changed by cutting off a portion at one end of the fiber, thus changing the ratio of the lengths of each kind of core in the fiber.

The oscillation sub-lengths and the period are controlled by the lengths of the core preform tablets. Fibers having oscillation sub-lengths of 1.2 to 2.5 km were drawn.

Other Fiber Types

The method of the invention has been specifically described in connection with the manufacture of DM single-mode optical fibers, and a description of a method of making such a fiber is set forth in the preceding specific example. However, it can be employed to make many other types of optical fibers having optical properties that systematically vary along the fiber's length. In each instance, the fiber can be made by inserting the appropriate tablets into a tube and processing the tube as described above.

Spontaneous Brilluoin Scattering (SBS) can be minimized by providing a fiber with alternate lengths that exhibit significantly different values of $\Delta$, wherein $\Delta$ is defined as $(n_1^2 - n_2^2)/2n_1^2$ ($n_1$ and $n_2$ are the refractive indices of the core and cladding, respectively. One of the types of tablets that is used to make the fiber preform exhibits a given $\Delta$, and the other type of tablet exhibits a significantly different value of $\Delta$. The $\Delta$-value of a fiber core can be controlled by controlling the amount of a dopant in the core or by changing the composition of the core, i.e. by adding other dopants to the core. Numerous dopants including oxides of tantalum, aluminum, boron can be employed for the purpose of changing refractive index and other properties such as viscosity.

A fiber that provides a filtering function could be made by alternately disposing in a tube a plurality of tablets that are capable of forming optical fiber having a filtering function and a plurality of tablets that are capable of forming standard, non-filtering optical fiber.

The tablets need not be of equal or nearly equal lengths. For example, a fiber could include relatively short sections, the cores of which are doped with active dopant ions capable of producing stimulated emission of light when pumped with light of suitable wavelength. Dopant ions of a rare earth such as erbium are particularly suitable for this purpose. Thus, a fiber having sections of erbium-doped core located at spaced intervals along its length could be made by employing relatively long tablets of standard, erbium-free core and relatively short tablets of erbium-doped core.

A fiber where the core systematically decreases in size such as that employed in Soliton fibers could be made by inserting into the tube a plurality of tablets, each having a core diameter smaller than the previous one or each having a core diameter larger than the previous one. Alternatively, some other core characteristic that affects dispersion could be varied in the tablets so that the dispersion of the resultant fiber monotonically decreased from one end of the fiber to the other.

The above-described examples employ alternately disposed tablets that have disparate optical properties. In one embodiment, a single core preform could be used to form all tablets. A single preform is formed such that its core has an azimuthally asymmetrical refractive index profile. For example, the core could be slightly out of round, i.e. the core cross-sectional shape of the core is an ellipse having a major axis and a minor axis (see U.S. Pat. No. 5,149,349). Alternatively, the fiber could contain stress rods on opposite sides of the core as disclosed in U.S. Pat. No. 5,152,818. An elliptical core fiber can be formed as follows. Tablets are severed from the preform. A cladding glass tube is provided with a coating of cladding glass soot. The tablets are inserted into the cladding glass tube such that the major axis of the elliptical core of one tablet is rotated with respect to the major axes the cores of adjacent tablets. After the cladding soot is consolidated and the tablets are fused to the tube and to each other, the resultant draw blank is drawn into an optical fiber having low polarization mode dispersion.

Using the methods of the present invention, dispersion managed fibers which employ alternating sections of positive and negative dispersion have been constructed which are suitable for telecommunication applications such as wavelength division multiplexing (WDM) systems, in which case the invention can be employed to reduce cumulative dispersion substantially to zero. Likewise, fibers have been constructed having alternating regions of positive slope and negative slope dispersion.

Using the methods herein, low loss dispersion managed fibers have been manufactured. By low loss, it is meant that the fibers have having attenuations of less than 0.5 dB/km, more preferably less than 0.25 dB/km and most preferably less than 0.22 dB/km over the operating wavelength range of about 1550 nm.

In addition, the preferred fibers in accordance with the invention are single mode optical waveguide fibers whose operating range (i.e., the source wavelength range is between about 1300 to 1700 nm, more preferably between about 1500 nm to about 1580 nm, and most preferably between about 1525 nm to 1565 nm, have been achieved. These fibers exhibit no attenuation at the interface between adjacent areas of having different optical characteristics.

Such fibers, as well as methods for their making, are further disclosed in U.S. patent application Ser. No. 08/844,997, filed Apr. 23, 1997; Ser. No. 08/423,656, filed Jan. 11, 1996, the specifications which are all hereby incorporated by reference.

Although the invention has been described in detail for the purpose of illustration, it is understood that such detail is solely for that purpose and variation can be made therein by those skilled in the art without departing from the spirit and scope of the invention which is defined by the following claims.

For example, although in FIG. 7 the method illustrated employs a soot layer on the outside of tube 90, the soot layer is optional, and several variations of this approach may be employed. For example, in one example, an assembly comprised of the tube 90 and the tablets 81 and 82 (but no soot layer 91) is fused together and redrawn into a fused monolithic assembly having a thinner diameter than tube 90. This redrawn assembly may then be coated with further glass soot, which may be doped or undoped, as desired. Alternatively, this fused monolithic assembly may, if desired, be drawn directly into a fiber. In either case, a vacuum is preferably applied to the tube 90 during the fusing step.

What is claimed is:

1. A method of making an optical fiber preform comprising the steps of:

arranging alternating regions of glass along or within a glass support member for maintaining the alternating regions of glass in a desired relationship with respect to one another, one said alternating regions comprising properties imparting a negative local dispersion and an adjacent one of said alternating regions comprising a positive local dispersion at a wavelength greater than 1480 nm when formed into an optical fiber;

fusing the glass support member and said glass regions together by heating said support member and said glass regions to a temperature sufficient to cause said tube and said glass regions to fuse together and consolidate into a preform.

2. The method of claim 1, wherein said fusing step comprises applying a vacuum to said support member and said glass regions.

3. The method of claim 1, further comprising, prior to said arranging step, forming said alternating regions of glass by a method which comprises chemical vapor deposition of glass soot.

4. The method of claim 3, further comprising, prior to said arranging step, heating said soot to a temperature sufficient to consolidate said soot into glass.

5. The method of claim 4, wherein said regions of glass in the arranging step are formed by a method which comprises stacking cut lengths of alternating regions after said consolidating of said soot into glass.

6. The method of claim 1, wherein said arranging step comprises arranging glass tablets within a glass tube.

7. The method of claim 6, wherein said fusing step comprises applying a vacuum to said tube.

8. The method of claim 7, wherein said arranging alternating glass regions comprises positioning a rod within said tube and assembling a plurality of tablets which surround at least portions of said rod.

9. The method of claim 1, wherein said arranging step comprises assembling a plurality of tablets along a glass rod, wherein said tablets surround at least portions of said rod.

10. The method of claim 9, wherein said tablets are donut shaped glass tablets.

11. The method of claim 1, further comprising, prior to said consolidating step, depositing a coating of cladding glass particles on the outer surface of said glass tube.

12. The method of claim 9, wherein said rod comprises a substantially continuous composition glass along at least a portion of its length which is at least as long as two of said tablets.

13. The method of claim 9, wherein said rod comprises a core glass.

14. The method of claim 1, further comprising, after said consolidation step, depositing a coating of cladding glass particles on the outer surface of a cladding glass tube.

15. A method of making an optical fiber preform comprising the steps of:

arranging alternating regions of glass within a glass tube, one of said alternating regions comprising properties imparting a dispersion having a negative slope and an adjacent one of said alternating regions comprising properties imparting a dispersion having a positive slope when formed into an optical fiber; and fusing the glass tube and said glass regions together by heating said tube and said glass regions to a temperature sufficient to cause said tube and said glass regions to fuse together and consolidate into a preform for use in making optical fiber.

16. The method of claim 15, wherein in said arranging alternating regions step, one of said alternating regions comprises a high index central core region having index $n_1$, followed by a lower index moat region having index $n_2$ which is less than index $n_1$, and a cladding region outside of said core region.

17. The method of claim 16, wherein said moat region comprises a refractive index less than pure $SiO_2$.

18. The method of claim 15, further comprising, prior to said arranging step, forming said alternating regions of glass by a method which comprises chemical vapor deposition of glass soot.

19. The method of claim 18, further comprising, prior to said arranging step, heating said soot to a temperature sufficient to consolidate said soot into glass.

20. The method of claim 15, wherein said arranging step comprises arranging glass tablets within a glass tube.

21. The method of claim 15, wherein said arranging step comprises assembling a plurality of tablets along a glass rod, wherein said tablets surround at least portions of said rod.

22. The method of claim 21, wherein said tablets are donut shaped glass tablets.

23. The method of claim 21, wherein said rod comprises a substantially continuous composition glass along at least a portion of its length which is at least as long as two of said tablets.

24. The method of claim 21, wherein said rod comprises a core glass.

25. The method of claim 20, wherein said arranging alternating glass regions comprises positioning a rod within said tube and assembling a plurality of tablets which surround at least portions of said rod.

26. The method of claim 15, further comprising, prior to said consolidating step, depositing a coating of cladding glass particles on the outer surface of said glass tube.

27. The method of claim 15, further comprising, after said consolidation step, depositing a coating of cladding glass particles on the outer surface of a cladding glass tube.

28. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein the optical characteristics of said tablets are such that those sections of fiber that correspond to a first plurality of tablets exhibit a given dispersion at a given wavelength of light and those sections of fiber that correspond to a second plurality of tablets exhibit a second dispersion different from said given dispersion at said given wavelength of light, whereby the dispersion of said fiber at said given wavelength is a value between said given dispersion and said second dispersion.

29. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein the refractive index profile of the core of a first fiber section is different from that of the cores of adjacent fiber sections.

30. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein the core composition of a first fiber section is different from the core composition of an adjacent fiber sections.

31. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein the core of a first fiber section contains a dopant capable of amplifying light, and the cores of an adjacent fiber sections are free from said dopant.

32. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein the optical characteristics of said sections are such that each of said sections exhibits a dispersion less than that of an adjacent fiber section, when said sections are analyzed from one end of said fiber to the other end thereof.

33. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein a first fiber section exhibits a given dispersion at a given wavelength of light and adjacent fiber sections exhibit a second dispersion different from said given dispersion at said given wavelength of light.

34. A method of making an optical fiber comprising the steps:

forming a plurality of glass tablets, a first tablet having different optical characteristics measured along a length thereof in comparison to an optical characteristic measured along a corresponding length of a second tablet positioned adjacent thereto, said tablets formed via a forming process which comprises chemical vapor deposition of soot and consolidation of the soot;

assembling a plurality of said glass tablets along or within a glass tablet alignment device to form a tablet assembly, heating the tablet assembly to a temperature sufficient to cause said tablets to fuse together into a preform or preform precursor; and forming an optical fiber from said preform or preform precursor, said fiber consisting of a plurality of longitudinal sections, each section corresponding to one of said tablets and including different optical characteristics along a longitudinal axis thereof wherein said tablets comprise at least one axial groove along the length of the tablet.

35. The method of claim 34, wherein said tablets comprise more than one axial groove, and said axial grooves are arranged symmetrically around the centerline of said tablet.

* * * * *

UNITED STATES PATENT AND TRADEMARK OFFICE
CERTIFICATE OF CORRECTION

PATENT NO.    : 6,173,588 B1
DATED         : January 16, 2001
INVENTOR(S)   : George E. Berkey, Venkata A. Bhagavatula It is certified that error appears in the above-identified patent and that said Letters Patent is hereby corrected as shown below:

Title page,
"METHOD OF MAKING DISPERSION MANAGED OPTICAL FIBERS" -- should be -- "METHOD OF MAKING OPTICAL FIBERS"
FOREIGN PATENT DOCUMENTS 1448080 "7/1976" should be -- 9/1976 --

Column 18,
Line 12, "member" should be -- members --
Line 14, "tube" should be -- support members --
Line 28, "the" should be -- said --
Line 63, "an" should be deleted Column 20,
Line 45, "sections" should be -- section --

Signed and Sealed this

Sixteenth Day of October, 2001

Attest:

NICHOLAS P. GODICI
Attesting Officer    Acting Director of the United States Patent and Trademark Office